(12) United States Patent
Moon et al.

(10) Patent No.: US 12,302,355 B2
(45) Date of Patent: May 13, 2025

(54) METHOD FOR TRANSMITTING OR RECEIVING DOWNLINK CONTROL CHANNEL AND DEVICE USING SAME

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR); Min Hyun Kim, Busan (KR); Ji Hung Kim, Daejeon (KR); Ju Ho Park, Daejeon (KR); Choong Il Yeh, Daejeon (KR); Jun Hwan Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/354,132

(22) Filed: Jul. 18, 2023

(65) Prior Publication Data

US 2023/0362950 A1    Nov. 9, 2023

Related U.S. Application Data

(63) Continuation of application No. 17/522,411, filed on Nov. 9, 2021, now Pat. No. 11,751,215, which is a
(Continued)

(30) Foreign Application Priority Data

Aug. 11, 2017 (KR) .................. 10-2017-0102634
Feb. 9, 2018  (KR) .................. 10-2018-0016542
(Continued)

(51) Int. Cl.
*H04W 72/04* (2023.01)
*H04B 7/024* (2017.01)
*H04W 72/23* (2023.01)

(52) U.S. Cl.
CPC ............ *H04W 72/23* (2023.01); *H04B 7/024* (2013.01)

(58) Field of Classification Search
CPC .... H04W 72/042; H04W 16/28; H04B 7/024; H04B 7/088; H04B 7/0695; H04L 1/00; H04L 5/00; H04L 27/26
See application file for complete search history.

(56) References Cited

U.S. PATENT DOCUMENTS 9,160,484 B2   10/2015  Malladi et al.
9,215,705 B2   12/2015  Seo et al.
(Continued)

FOREIGN PATENT DOCUMENTS

EP   2811850 B1       10/2016
WO   2008098815 A1    8/2008
WO   2011122852 A2    10/2011

OTHER PUBLICATIONS

ZTE Maintenance for beam management; R1-1808196 3GPP TSG RAN WG1 Meeting #94, Aug. 24, 2018(Aug. 24, 2018), sections 2-4 (Year: 2018).*
(Continued)

*Primary Examiner* — Lan-Huong Truong
(74) *Attorney, Agent, or Firm* — Rabin & Berdo, P.C.

(57) ABSTRACT

A method for receiving a PDCCH by a terminal in a mobile communication system may comprise the steps of: receiving a first PDCCH including first DCI from a base station through a first PDCCH search space; and receiving a second PDCCH including second DCI from the base station through a second PDCCH search space, wherein the first DCI and second DCI are for scheduling the same PDSCH for the
(Continued)

same TB or TBs associated with the same HARQ process, are for scheduling different PDSCHs for the same TB or TBs associated with the same HARQ process, or are for scheduling different PDSCHs for different TBs or TBs associated with different HARQ processes. In addition, the first DCI and second DCI may be received from the base station within a time window.

20 Claims, 9 Drawing Sheets

Related U.S. Application Data continuation of application No. 16/638,068, filed as application No. PCT/KR2018/009044 on Aug. 8, 2018, now Pat. No. 11,206,655.

(30) Foreign Application Priority Data

| Feb. 14, 2018 | (KR) | .................. | 10-2018-0018719 |
|---|---|---|---|
| Mar. 21, 2018 | (KR) | .................. | 10-2018-0032881 |
| Apr. 2, 2018 | (KR) | .................. | 10-2018-0038178 |
| May 21, 2018 | (KR) | .................. | 10-2018-0057756 |

(56) References Cited

U.S. PATENT DOCUMENTS

| 10,122,558 | B2 | 11/2018 | Nory et al. |
| 11,129,152 | B2 | 9/2021 | You et al. |
| 2014/0293924 | A1 | 10/2014 | Wang et al. |
| 2016/0192336 | A1 | 6/2016 | Choi et al. |
| 2017/0181169 | A1* | 6/2017 | Choi ................... H04B 7/0408 |
| 2018/0310257 | A1* | 10/2018 | Papasakellariou .... H04W 72/23 |
| 2019/0098613 | A1 | 3/2019 | Chen et al. |
| 2019/0158205 | A1 | 5/2019 | Sheng et al. |
| 2020/0119869 | A1* | 4/2020 | Taherzadeh Boroujeni ................ H04L 5/0023 |
| 2020/0145982 | A1* | 5/2020 | Cheng .................. H04W 72/23 |
| 2021/0014011 | A1 | 1/2021 | Xiong et al. |

OTHER PUBLICATIONS

MCC Support, "Final Report of 3GPP TSG RAN WG1 #AH_NR3v1.0.0, (Nagoya, Japan, Sep. 18-21, 2017)," 3GPP TSG RAN WG1 Meeting #90bis, R11-1716942, Prague, Czech Rep, Oct. 9-13, 2017 (Year: 2017).*

"CORESET configuration and search space design", Source: Huawei, HiSilicon, Agenda Item: 7.3.1.2, 3GPP TSG RAN WG1 Meeting #91 Reno, USA, Nov. 27-Dec. 1, 2017 R1-1719387.

"Multi-beam Transmission for NR-PDCCH", Source: Samsung, Agenda Item: 7.1.3.1.1, 3GPP TSG RAN WG1 Meeting #89 Hangzhou, China, May 15-19, 2017 R1-1707987.

"On Remaining Issues for Search Space and Blind Decoding", Source: Ericsson, Agenda Item: 7.3.1.2, 3GPP TSG RAN1 WG1 Meeting #91 Reno, USA, Nov. 27-Dec. 1, 2017R1-1720993.

Source: Ericsson, "On beam indication, measurement, and reporting", Agenda Item: 6.2.2.3, R1-1716350, 3GPP TSG-RAN WG1 NR Ad Hoc #3, Nagoya, Japan, Sep. 18-21, 2017.

Source: Huawei, HiSilicon, "Multiple NR-PDCCH for Multiple TRP transmission", Agenda Item: 5.1.2.1.6, R1-1709924, 3GPP TSG RAN WG1 NR Ad Hoc Meeting, Qingdao, China, Jun. 27-30, 2017.

Source: Qualcomm Incorporated, "Discussion on QCL", Agenda item: 5.1.2.4.7, R1-1711176, 3GPP TSG RAN WG1 NR Ad-Hoc#2, Jun. 27-30, 2017, Qingdao, China.

* cited by examiner

METHOD FOR TRANSMITTING OR RECEIVING DOWNLINK CONTROL CHANNEL AND DEVICE USING SAME

CROSS-REFERENCE TO RELATED APPLICATIONS

This application is a continuation of U.S. application Ser. No. 17/522,411, filed on Nov. 9, 2021, which was a continuation of U.S. application Ser. No. 16/638,068, filed on Feb. 10, 2020 (issued on Dec. 21, 2021 as U.S. Pat. No. 11,206,655), which was a National Stage application of PCT/KR2018/009044, filed on Aug. 8, 2018, and claims priority to and the benefit of Korean Patent Applications No. 10-2017-0102634, filed on Aug. 11, 2017, No. 10-2018-0016542, filed on Feb. 9, 2018, No. 10-2018-0018719, filed on Feb. 14, 2018, No. 10-2018-0032881, filed on Mar. 21, 2018, No. 10-2018-0038178, filed on Apr. 2, 2018, and No. 10-2018-0057756, filed on May 21, 2018, the entire contents of which are incorporated herein by reference.

TECHNICAL FIELD

The present invention relates to a mobile communication system, and more particularly, to a method for transmitting and receiving a downlink control channel for transmission of control information and a method for monitoring a downlink control channel by a terminal in a multi-beam based mobile communication system.

BACKGROUND ART

In a wireless communication system, a physical channel is a channel for transmitting information from a higher layer from a transmitter to a receiver by using radio resources such as time, frequency, and space, and may include a control channel and a data channel. In case of a cellular system, a base station transmits downlink control information (DCI) to a terminal through a downlink control channel, and transmit common data (e.g., broadcast information, system information) and terminal-specific data to the terminal through a downlink data channel.

Also, the terminal transmits uplink control information (UCI) to the base station through an uplink control channel, and transmits UCI and terminal-specific data to the base station through an uplink data channel. The terminal-specific data may include user plane data and control plane data.

DISCLOSURE

Technical Problem

An objective of the present invention for solving the above-described problem is to provide a method for transmitting a downlink control channel in a multi-beam based mobile communication system.

Another objective of the present invention for solving the above-described problem is to provide a method for receiving a downlink control channel in a multi-beam based mobile communication system.

Technical Solution

An embodiment of the present invention for achieving the above-described objective, as a method for transmitting a downlink control channel (physical downlink control channel (PDCCH)) performed by a base station in a communication system, may comprise transmitting a first PDCCH including a first downlink control information (DCI) to a terminal through a first PDCCH search space; and transmitting a second PDCCH including a second DCI to the terminal through a second PDCCH search space, wherein the first DCI and the second DCI are for scheduling a same downlink data channel (physical downlink shared channel (PDSCH)) for a same transport block (TB) or TBs belonging to a same hybrid automatic repeat request (HARQ) process, for scheduling different PDSCHs for a same TB or TBs belonging to a same HARQ process, or for scheduling different PDSCHs for different TBs or TBs belonging to different HARQ processes, and wherein the first DCI and the second DCI are transmitted to the terminal within a time window.

The first search space and the second search space may belong to different control resource sets (CORESETs).

Information of a quasi-co-location (QCL) configuration for reception of a CORESET to which the first PDCCH search space or the second PDCCH search space belongs may be configured in the terminal through a combination of a radio resource control (RRC) signaling and a medium access control (MAC) control element (CE) signaling, or through an RRC signaling.

Information on the time window may be provided to the terminal.

Information on a number of DCIs transmitted for scheduling the same TB or the TBs belonging to the same HARQ process may be provided to the terminal, the DCIs may include the first DCI and the second DCI, and the DCIs may be transmitted within the time window.

Information on whether the first DCI and the second DCI have a same payload may be provided to the terminal.

Information on whether the first DCI and the second DCI are for the same TB or the TBs belonging to the same HARQ process, or for different TBs or TBs belonging to different HARQ processes may be provided to the terminal.

An embodiment of the present invention for achieving the above-described another objective, as a method for receiving a downlink control channel (PDCCH) performed by a terminal in a communication system, may comprise receiving from a base station a first PDCCH including a first DCI through a first PDCCH search space; and receiving from the base station a second PDCCH including a second DCI through a second PDCCH search space, wherein the first DCI and the second DCI are for scheduling a same downlink data channel (PDSCH) for a same TB or TBs belonging to a same HARQ process, for scheduling different PDSCHs for a same TB or TBs belonging to a same HARQ process, or for scheduling different PDSCHs for different TBs or TBs belonging to different HARQ processes, and wherein the first DCI and the second DCI are received from the base station within a time window.

The first search space and the second search space may belong to different CORESET s.

Information of a QCL configuration for reception of a CORESET to which the first PDCCH search space or the second PDCCH search space belongs may be configured from the base station through a combination of a RRC signaling and a MAC CE signaling, or through an RRC signaling.

Information on the time window may be provided from the base station.

Information on a number of DCIs transmitted for scheduling the same TB or the TBs belonging to the same HARQ process may be provided from the base station, the DCIs may include the first DCI and the second DCI, and the DCIs may be received within the time window.

Information on whether the first DCI and the second DCI have a same payload may be provided from the base station.

Information on whether the first DCI and the second DCI are for the same TB or the TB s belonging to the same HARQ process, or for different TB s or TB s belonging to different HARQ processes may be provided from the base station.

Another embodiment of the present invention for achieving the above-described another objective, as a method for receiving a downlink control channel (PDCCH) performed by a terminal in a communication system, may comprise performing a blind decoding on a first PDCCH candidate in a first PDCCH search space; and when the blind decoding on the first PDCCH candidate is successful, performing a blind decoding on a second PDCCH candidate associated with the first PDCCH candidate in a second PDCCH search space.

The first search space and the second search space may belong to different CORESET s.

PDCCHs including DCIs for a same TB may be received through the associated first PDCCH candidate and second PDCCH candidate.

PDCCHs including DCIs for different TB s may be received through the associated first PDCCH candidate and second PDCCH candidate.

Blind decoding priorities for the first PDCCH search space and the second PDCCH search space may be configured from the base station.

The first PDCCH search space and the second PDCCH search space may have a same control channel element (CCE) aggregation level and a same number of PDCCH candidates.

Advantageous Effects

Using the embodiments according to the present invention, a transmission reliability of the downlink control channel can be improved in the multi-beam-based mobile communication system, and a burden of blind decoding on the downlink control channel at the terminal can be reduced.

MODES OF THE INVENTION

Figure 1:
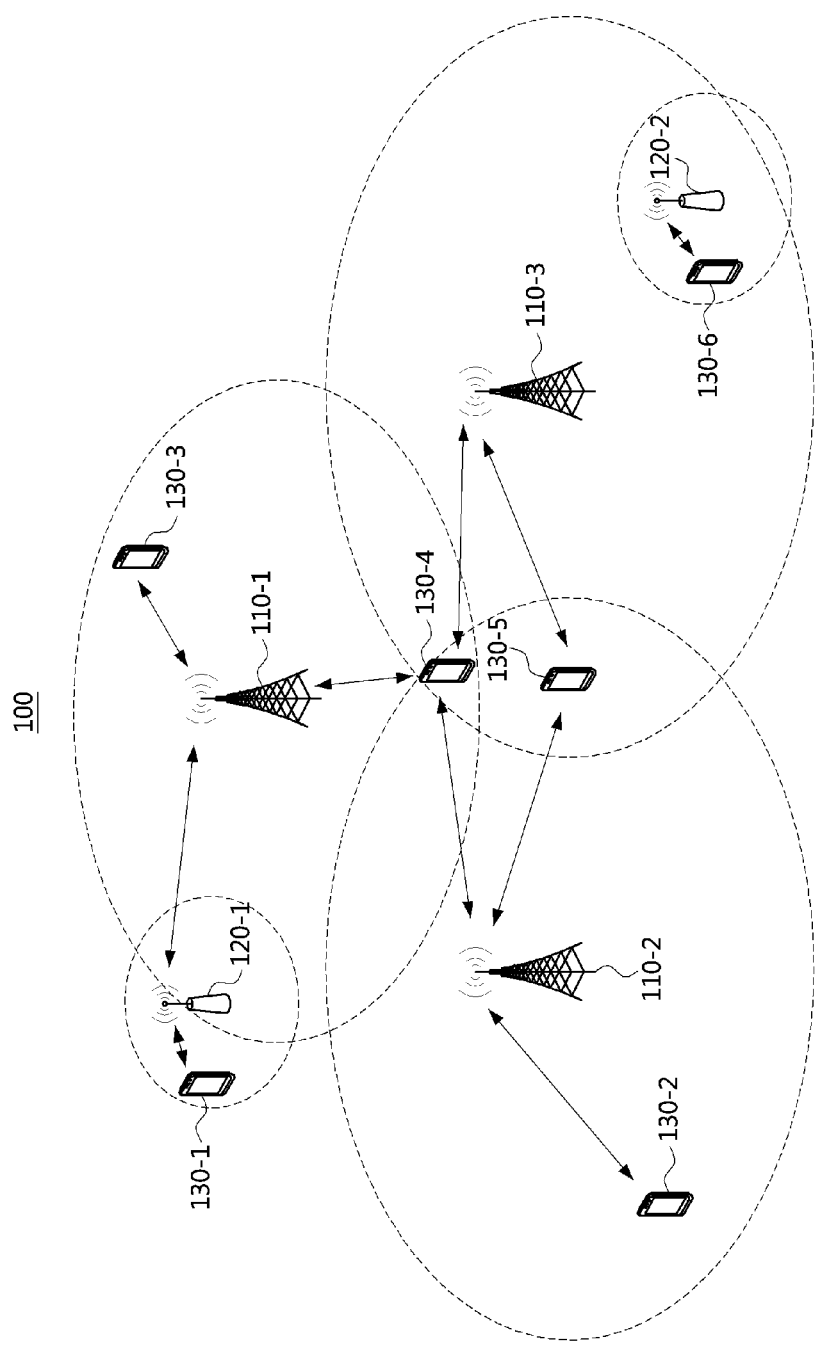
FIG. 1 is a conceptual diagram illustrating a mobile communication system according to an embodiment of the present invention.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings.

Throughout the specification, a terminal may be a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), or the like. Also, the terminal may include all or a part of functions of MT, MS, AMS, HR-MS, SS, PSS, AT, UE, or the like.

Also, a base station may be an advanced base station (ABS), a high reliability base station (HR-BS), a node B, an evolved node B (eNB), an access point (AP), a radio access station (RAS), a base transceiver station (BTS), a mobile multi-hop relay (MMR)-BS, a relay station (RS) performing a role of the base station, a high reliability relay station (HR-RS) performing a role of the base station, a small cell base station, or the like. Also, the base station may include all or a part of functions of BS, ABS, HR-BS, node B, eNB, AP, RAS, BTS, MMR-BS, RS, HR-RS, small cell base station, or the like.

FIG. 1 is a conceptual diagram illustrating a mobile communication system according to a first embodiment of the present disclosure.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
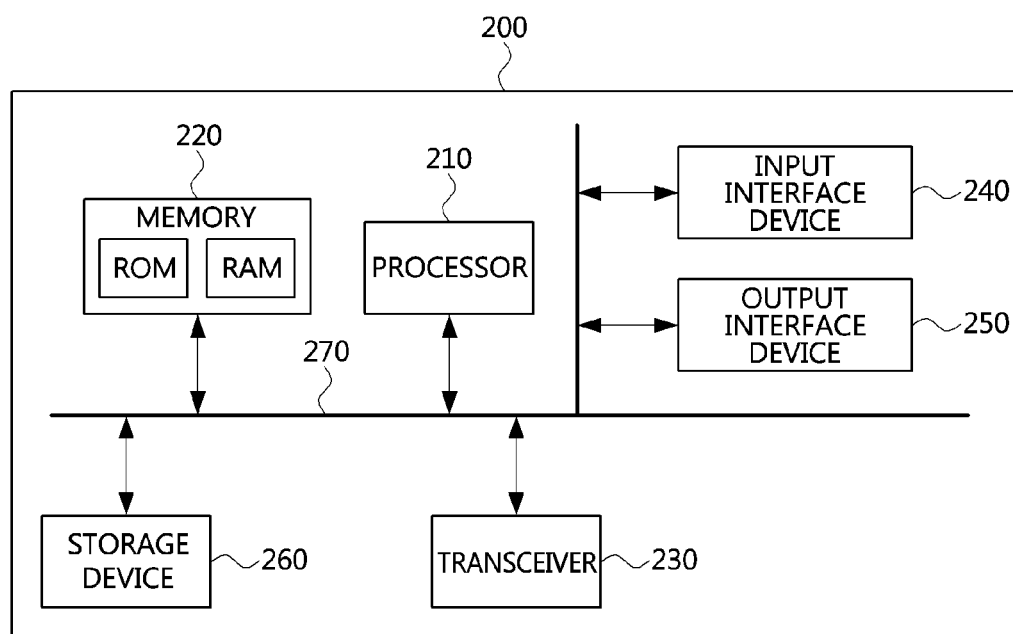
FIG. 2 is a block diagram illustrating a communication node in a mobile communication system according to an embodiment of the present invention.

FIG. 2 is a block diagram illustrating a communication node in a mobile communication system according to a first embodiment of the present disclosure.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a digital unit (DU), a cloud digital unit (CDU), a radio remote head (RRH), a radio unit (RU), a transmission point (TP), a transmission and reception point (TRP), a relay node, or the like. Also, each of the plurality of terminals 130-1, 130-2, 130-3, 130-4, 130-5, and 130-6 may refer to a terminal, an access terminal, a mobile terminal, a station, a subscriber station, a mobile station, a portable subscriber station, a node, a device, or the like.

Each of the plurality of communication nodes 110-1, 110-2, 110-3, 120-1, 120-2, 130-1, 130-2, 130-3, 130-4, 130-5, and 130-6 may support a long-term evolution (LTE), a LTE-Advanced (LTE-A), or the like defined in the cellular communication standard (e.g., 3GPP standard). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink transmission and SC-FDMA based uplink transmission. Also, each of the plurality of base stations 110-1, 110-2, 110-3, 120-1, and 120-2 may support a multi-input multioutput (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In the 3rd generation partnership project (3GPP) long term evolution (LTE) system as an example of the mobile communication system, there are a physical downlink control channel (PDCCH) and a physical downlink shared channel (PDSCH) as a downlink control channel and a downlink data channel, respectively. The downlink control information (DCI) of the LTE system includes common information such as system information, random access response, paging information, and terminal-specific information such as uplink and downlink data channel scheduling information. The PDCCH may be composed using physical resources up to 4 consecutive symbols at the beginning of each subframe, and may occupy all physical resource blocks (PRBs) of the system bandwidth in the frequency domain. The PDCCH may coexist with a physical control format indicator channel (PCFICH) which is another downlink control channel in the first symbol, and may coexist with a physical hybrid ARQ indicator channel (PHICH) in some cases.

Meanwhile, a new radio (NR) system currently under standardization in the 3GPP has requirements of forward compatibility and high configuration flexibility. Accordingly, a downlink control channel (hereinafter referred to as 'PDCCH') of the NR system may have a different form and characteristics from the LTE PDCCH. For example, the NR system may vary a numerology applied to the physical channel. Table 1 below is a table for explaining a variable numerology composition to be applied to the NR mobile communication system.

TABLE 1

| Subcarrier spacing | 15 kHz | 30 kHz | 60 kHz | 120 kHz | 240 kHz |
|---|---|---|---|---|---|
| OFDM symbol length (μs) | 66.7 | 33.3 | 16.7 | 8.3 | 4.2 |
| CP length (μs) | 4.76 | 2.38 | 1.19 | 0.60 | 0.30 |
| Number of OFDM symbols within 1 ms | 14 | 28 | 56 | 112 | 224 |

In Table 1, 5 different numerologies for a waveform of cyclic prefix orthogonal frequency division multiplexing (CP-OFDM) are represented. Referring to Table 1, subcarrier spacings of the respective numerologies have a power of two relationship with respect to each other, and the CP lengths are reduced at the same rate as the OFDM symbol lengths. The NR mobile communication system is expected to support all of the 5 types of numerologies shown in Table 1, and various numerologies including them may be applied to the physical channel including the PDCCH.

Hereinafter, a frame structure of the NR mobile communication system will be briefly described.

The time domain building blocks of the frame structure of the NR mobile communication system include a subframe, a slot, and a mini-slot. The subframe is a time unit having a fixed value of 1 ms regardless of a subcarrier spacing, and the slot is composed of 14 consecutive OFDM symbols. Accordingly, in the NR mobile communication system, the length of the slot varies in inverse proportion to the subcarrier spacing, unlike the length of the subframe. The slot may be used as a minimum scheduling unit. The base station may schedule a data channel (e.g., PDSCH or physical uplink shared channel (PUSCH)) to the terminal by using a part of a slot or an entire slot, and may schedule a data channel to the terminal by using a plurality of slots. Also, the terminal may be configured with one or a plurality of slots from the base station as a PDCCH monitoring periodicity.

Meanwhile, the NR mobile communication system also supports scheduling of a data channel with duration shorter than a slot. When a time duration of the data channel is continuous, the data channel may be scheduled to one or more symbols, and transmission of the data channel may be started in any symbol. Also, the terminal may be configured with a PDCCH monitoring occasion in units of symbols.

The frequency domain building block of the frame structure of the NR mobile communication system is a physical resource block (PRB). One PRB may be composed of 12 subcarriers regardless of a numerology. Accordingly, a bandwidth occupied by one PRB is proportional to the subcarrier spacing of the numerology. For example, a PRB bandwidth according to a numerology with a subcarrier spacing of 60 kHz is 720 kHz, and a PRB bandwidth according to a numerology with a subcarrier spacing of 15 kHz is 180 kHz. The PRB may be used as a frequency domain minimum resource allocation unit for the control channel and the data channel. Alternatively, in case of the data channel, a resource block group (RBG) composed of a plurality of consecutive PRBs may be used as a frequency domain minimum resource allocation unit The slot format of the NR mobile communication system is composed of a combination of a downlink duration, an unknown duration, and an uplink duration. Each duration may be composed of one or a plurality of consecutive symbols. For example, the downlink duration may be composed of one or a plurality of downlink symbols. One slot may include 0, 1, or 2 unknown durations, and the unknown duration may be disposed after the downlink duration or may be disposed before the uplink duration. In the unknown duration, the terminal may not perform any operation until the unknown duration is overridden by another uplink or downlink transmission.

The slot format may be configured semi-statically by a higher layer signaling. The semi-static slot format information may be configured in a cell-specific manner by system information, and may be additionally configured for each terminal through a terminal-specific (UE-specific) radio resource control (RRC) signaling. An unknown duration of the cell-specific slot format may be overridden by downlink or uplink by the UE-specific RRC configuration. Also, the slot format may be dynamically indicated by a DCI in form of a slot format indicator (SFI). The terminal may periodically monitor the SFI for each slot or a plurality of slots. The SFI may indicate a slot format for one or more consecutive slots, and the number of slots indicated by the SFI may be less than or equal to an SFI monitoring periodicity.

Meanwhile, in the NR mobile communication system, a terminal may perform downlink and uplink operations in a bandwidth part. The bandwidth part may be defined as a set of consecutive PRBs in the frequency domain, and only one numerology may be used for transmission of control channels or data channels within one bandwidth part. The base station may configure one or a plurality of bandwidth parts to the terminal, and the terminal may receive a PDSCH or transmit a PUSCH using a PRB or a RBG as a frequency domain resource allocation unit within the configured bandwidth part.

Configuration information of the bandwidth part may include a numerology of the bandwidth part, i.e., a subcarrier spacing and/or a CP length. Also, the configuration information of the bandwidth part may include a position of a starting PRB and the number of PRBs. The position of the starting PRB may be represented by an RB index in a reference resource block (RB) grid. The terminal may be configured to have at most 4 bandwidth parts for each of uplink and downlink in one carrier. In case of time division duplex (TDD), an uplink bandwidth part and a downlink bandwidth part are configured as a pair.

At least one bandwidth part among the bandwidth part(s) configured in the terminal may be activated. For example, one uplink bandwidth part and one downlink bandwidth part may be activated within one carrier, respectively. In case of TDD, a pair of one uplink bandwidth part and one downlink bandwith part may be activated.

When a plurality of bandwidth parts are configured to the terminal within one carrier, the active bandwidth part of the terminal may be switched. That is, the previously activated bandwidth part may be deactivated, and at the same time a new bandwidth part may be activated. In case of FDD, the bandwidth part switching may be applied to each of uplink and downlink, and in case of TDD, a pair of the uplink bandwidth part and the downlink bandwidth part may be switched. The bandwidth part switching may be performed by a higher layer signaling (e.g., RRC signaling) or may be performed dynamically by a physical layer signaling (e.g., downlink control information (DCI)). In the latter case, a bandwidth part index may be indicated by a bandwidth part indicator field of the DCI. When the bandwidth part index received through the DCI is different from the index of the current activated bandwidth part, the terminal may perform an operation of switching the current activated bandwidth part to the bandwidth part indicated by the DCI. The DCI may be a DCI including scheduling information of a PDSCH or a PUSCH. In this case, the PDSCH or PUSCH scheduled through the DCI may be transmitted in the bandwidth part indicated by the bandwidth part indicator field.

The present invention relates to a method for transmitting and receiving a downlink control channel, and more specifically, to a method for configuring a resource of a downlink control channel for supporting multi-beam transmission, definition of a search space, priority configuration, and the like. The present invention will be described by taking the NR-based mobile communication system as an example for convenience of explanation, but the embodiments of the present invention are not limited thereto, and may be applied to various mobile communication systems.

Method for Transmitting and Receiving PDCCH

The minimum resource unit constituting the NR PDCCH is a resource element group (REG). One REG may be composed of one PRB, i.e., 12 subcarriers in the frequency domain and one OFDM symbol in the time domain. Accordingly, one REG has 12 resource elements (REs). The RE is a minimum physical resource unit composed of one subcarrier and one OFDM symbol in the OFDM system. A demodulation reference signal (DMRS) for decoding the PDCCH may be mapped to 3 REs among the 12 REs constituting each REG, and PDCCH data, i.e., channel-coded and modulated DCI, may be mapped to the remaining 9 REs.

One PDCCH candidate is composed of 1 control channel element (CCE) or aggregation of a plurality of CCEs, and one CCE is composed of a plurality of REGs. In the present specification, a CCE aggregation level is denoted as L, and the number of REGs constituting one CCE is denoted as K. In the NR system, K=6 and L=1, 2, 4, 8 or 16. The higher the CCE aggregation level, the more physical resources are used for PDCCH transmission, which can improve a PDCCH reception performance by lowering a code rate.

A control resource set (CORESET) is a resource region in which a terminal performs a blind decoding on a PDCCH and is composed of a plurality of REGs. The CORESET is composed of one or a plurality of PRBs in the frequency domain and is composed of one or a plurality of symbols (e.g., OFDM symbols) in the time domain. Symbols constituting one CORESET are continuous in the time domain, but PRBs constituting one CORESET may be continuous or discontinuous in the frequency domain. One DCI message, i.e., one PDCCH, is transmitted in one CORESET or in one search space logically associated with the CORESET. A plurality of CORESETs may be configured in terms of cell and terminal, and the CORESETs may overlap each other. In the LTE and NR systems, the DCI is transmitted through the PDCCH. In this reason, the PDCCH and the DCI may be used herein as synonymous terms.

A CORESET may be configured in the terminal according to system information transmitted through a physical broadcast channel (PBCH). This is defined as a CORESET 0 (i.e., CORESET with ID=0) in the NR system. The CORESET 0 is a region in which a PDCCH is initially monitored when a terminal in an RRC idle (RRC_idle) state performs an initial access, and may be monitored by a terminal in an RRC connected (RRC_connected) state as well as the terminal in the RRC_idle state. Also, a CORESET may be configured in the terminal through other system information (e.g., system information block Type 1 (SIB1), or remaining minimum system information (RMSI)) other than the system information transmitted through the PBCH. For example, a CORESET may be configured in the terminal by the SIB1 in order to receive Msg2 and Msg4 for random access. Also, a CORESET may be configured in the terminal by a cell-specific RRC signaling or a UE-specific RRC signaling.

The terminal may be configured to have one or a plurality of CORESETs for each downlink bandwidth part. The CORESET 0 is present in an initial active downlink bandwidth part, but may also be configured in another downlink bandwidth part configured by RRC. Here, that the CORESET is configured in the bandwidth part means that the CORESET is logically associated with the bandwidth part and the terminal monitors the corresponding CORESET in the bandwidth part. The terminal may regard a CORESET configured by a PBCH logically associated with a synchronization signal (SS)/PBCH block in a primary cell (i.e., PCell) as the CORESET 0. The terminal may be not configured to have a CORESET logically associated with an SS/PBCH block in a secondary cell (i.e., SCell). In this case, a CORESET 0 in the secondary cell may be a CORESET configured by an RRC signaling.

A blind decoding scheme may be used for PDCCH reception at the terminal. In this case, a search space is a set of candidate resource regions through which PDCCHs can be transmitted. The terminal may perform a blind decoding on each PDCCH candidate in a predefined search space to determine whether a PDCCH is transmitted to itself through a cyclic redundancy check (CRC) and receive the PDCCH. Each PDCCH candidate may be composed of CCEs selected by a predefined hash function within the CORESET or the search space occasion. The search space may be defined and configured for each CCE aggregation level. Each search space may be logically associated with one CORESET, and one CORESET may be logically associated with one or more search spaces. A common search space configured by the PBCH may be used to monitor a DCI scheduling a PDSCH carrying the SIB1, which is defined as a search space 0 (i.e., search space with ID=0) in the NR system. The search space 0 may be logically associated with the CORESET 0.

The PDCCH search space may be classified into a common search space and a terminal-specific search space (i.e., UE-specific search space). A common DCI may be mainly transmitted in the common search space, and a UE-specific DCI may be mainly transmitted in the UE-specific search space. However, in consideration of degree of freedom in scheduling and fallback transmission, the UE-specific DCI may be transmitted also in the common search space. Examples of the common DCI may include resource allocation information of a PDSCH for transmission of system information, paging, power control command, slot format indicator, preemption indicator, and the like. Examples of the UE-specific DCI may include resource allocation information for transmission of a PDSCH and a PUSCH. A plurality of DCI formats may be defined according to a payload, a size, a type of a radio network temporary identifier (RNTI), and the like of the DCI.

Meanwhile, in the NR system, beam operations in a high frequency band and a low frequency band may be different from each other. In the low-frequency band (e.g., the band below 6 GHz), since a path loss of signals due to a channel is relatively small, the signals may be transmitted and received using a beam having a wide beamwidth. In particular, in case of a control channel, a single beam may cover an entire coverage of a cell or a sector. However, beamforming may be applied to transmission and reception of the signals by using a plurality of antennas in the high frequency band (e.g., the band above 6 GHz) in which a path loss of the signals is large. Also, for coverage extension of the cell or the terminal, beamforming may be applied not only to the data channel but also to the common signal and the control channel. In this case, when a beam having a narrow beamwidth is formed through a plurality of antennas, a signal may be transmitted or received a plurality of times through beams having a plurality of different directivities in order to cover the entire coverage of the cell or the sector. Such the operation in which a beamformed signal is transmitted several times through different resources in the time domain may be referred to as a 'beam sweeping'. A system for transmitting a signal using a plurality of beams having a narrow beamwidth will be referred to as a multi-beam system for convenience.

In the multi-beam system, a beam management may be required. That is, the terminal may measure qualities of beams through reception of a specific reference signal (RS) (e.g., RS for beam management or RS for beam failure detection), and may report one or more beams having a good quality to the base station. For example, the terminal may calculate a reference signal received power (RSRP) for each beam, and report an optimal beam from the RSRP perspective to the base station. The base station may determine a beam to be applied to transmission of a physical signal or a channel on the basis of the beam quality information reported from the terminal, and configure one or a plurality of transmission configuration information (TCI) states for the physical channel (e.g., PDCCH or PDSCH) to the terminal. The TCI state may include an ID and/or a quasi-co-location (QCL) type of a reference signal having a QCL relationship with a DMRS of the physical channel to which the TCI is applied. The QCL may be a spatial QCL. The fact that the spatial QCL is established between reference signal(s) and/or channel(s) may mean that the terminal may assume the same reception beam and the same reception channel spatial correlation between the reference signal(s) and/or the channel(s). In addition to the spatial QCL, the channel characteristics such as delay spread, Doppler spread, Doppler shift, average gain, and average delay may be configured to the terminal as the QCL. In the present specification, the term 'QCL' may mean a QCL in a general sense including the above types depending on the situation, or a spatial QCL.

Even in case of the NR PDCCH, beamforming may be applied to transmission and/or reception for coverage expansion of the control channel. For beam-based PDCCH transmission, the base station may configure a TCI state for a PDCCH to the terminal. In this case, a plurality of TCI states may be configured to the terminal for the PDCCH monitoring so as to achieve a beam diversity effect. Particularly, in case of a UE-specific PDCCH, a beam having a narrower beamwidth may be used according to a UE-specific beamforming, so that a probability of beam blocking is higher than that of a common PDCCH. Therefore, the terminal should be able to be configured with a plurality of TCI states to monitor at least the UE-specific PDCCH.

A TCI state may be configured for each CORESET or each PDCCH search space. Alternatively, the TCI state may be configured to a smaller unit, e.g., a PDCCH candidate set or a CCE set. In the present specification, it is assumed that the TCI state may be configured for each CORESET. The base station may configure TCI state candidate(s) for each CORESET in the terminal through an RRC signaling, and may configure or indicate one TCI state used for CORESET monitoring of the terminal through a MAC signaling. When there is one TCI state candidate configured by the RRC signaling, the MAC signaling may be omitted. Exceptionally, in case of the CORESET 0, the terminal may assume that a QCL is established between the CORESET and an SS/PBCH block logically associated with the search space of the CORESET 0 or a specific SS/PBCH block selected by the terminal (e.g., an SS/PBCH block applied for transmission of a physical random access channel (PRACH) for initial access) without the signaling of the TCI state from the base station.

In an embodiment of the present invention, when the reliability of the PDCCH transmission is to be enhanced, the base station may configure a plurality of CORESETs to the terminal, configure a different QCL to each CORESET, and transmit PDCCHs through the plurality of CORESETs.

Figure 3:
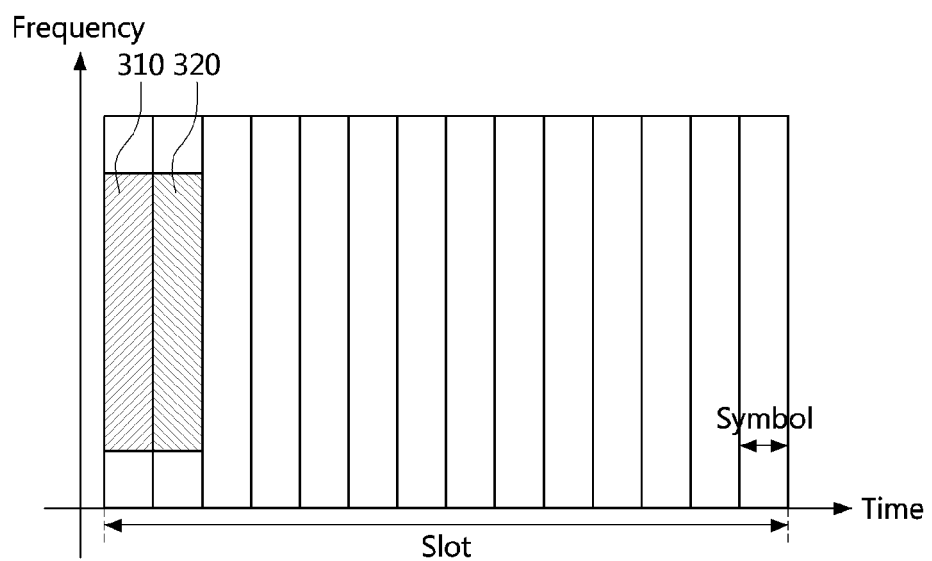
FIG. 3 is a conceptual diagram illustrating a PDCCH transmission method according to an embodiment of the present invention.

FIG. 3 is a conceptual diagram illustrating a PDCCH transmission method according to an embodiment of the present invention.

Referring to FIG. 3, different QCLs may be configured for a first CORESET 310 and a second CORESET 320. In FIG. 3, a case where a plurality of CORESETs are configured in a time division multiplexing (TDM) manner in one slot is shown. In this case, the terminal may apply a reception beamforming for each CORESET irrespective of a RF chain capability of the terminal.

Hereinafter, in the embodiments of the present invention, two scenarios are assumed. The first scenario is to configure a different QCL for each CORESET in a single transmission and reception point (TRP), or to configure a different QCL for each CORESET in a plurality of TRPs connected through an ideal backhaul. Also, the second scenario is to configure a different QCL for each CORESET in a plurality of TRPs connected through a non-ideal backhaul. Here, the single TRP or the plurality of TRPs may be connected to one base station.

First, in case of the first scenario, PDCCHs of a plurality of CORESETs may be transmitted by the same TRP or by different TRPs. In the latter case, the TRPs may belong to the same cell or to different cells. In the first scenario, the terminal may monitor a PDCCH using a reception beam corresponding to the corresponding QCL for each CORESET. Here, it may be difficult to simultaneously receive a plurality of reception beams in the same symbol when the number of reception RF chains of the terminal is small. For such the terminal, CORESETs having different QCLs may have to be configured in different symbols.

The transmission through the plurality of TRPs in the first and second scenarios may refer to a case where a multiple TRP cooperative transmission is applied. A dynamic point selection (DPS) scheme and a non-coherent joint transmission (NC-JT) may be considered as a scheme of the cooperative transmission, and both of the ideal backhaul and the non-ideal backhaul may be considered as a backhaul environment between the TRPs. In the embodiments of the present invention, a situation in which the plurality of TRPs are connected through non-ideal backhaul links is defined as the second scenario. In the second scenario assuming the non-ideal backhaul environment, an independent scheduler may be operated on a per-TRP basis because a backhaul link latency does not allow immediate data exchange between the TRPs. The scheduler of each TRP may schedule a PUSCH and a PDSCH by transmitting a scheduling DCI through the PDCCH.

For example, in case of the multiple TRP cooperative transmission, the base station may configure 2 CORESETs in the terminal, transmit a PDCCH at the first TRP through the first CORESET, and transmit a PDCCH at the second TRP through the second CORESET. Since the plurality of TRPs have different geographical locations, the QCL may have to be configured for each CORESET. On the other hand, in particular, in the band below 6 GHz, signals from multiple TRPs may also be received based on the same QCL hypothesis. In this case, the terminal may receive a PDCCH from each TRP through one CORESET.

Figure 4A:
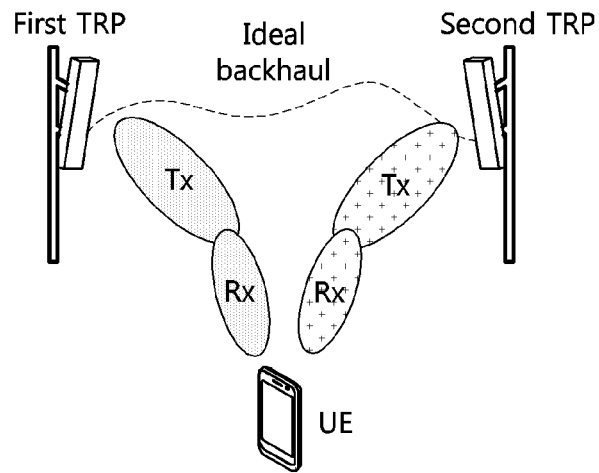
FIG. 4A is a conceptual diagram for explaining an application example to a first scenario of a PDCCH transmission method according to an embodiment of the present invention.
Figure 4B:
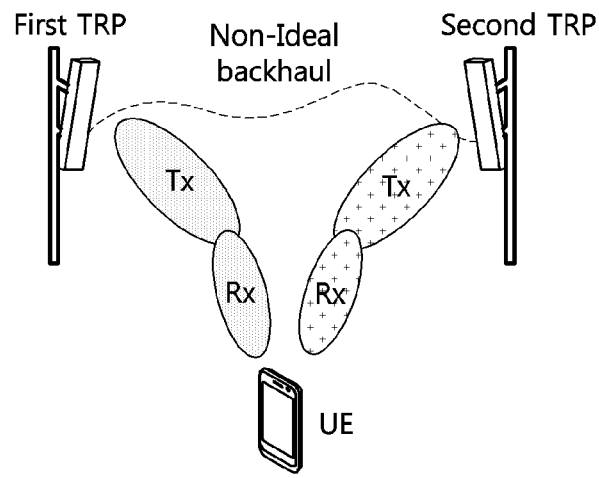
FIG. 4B is a conceptual diagram for explaining an application example to a second scenario of a PDCCH transmission method according to an embodiment of the present invention.

FIG. 4A is a conceptual diagram for explaining an application example to a first scenario of a PDCCH transmission method according to an embodiment of the present invention, and FIG. 4B is a conceptual diagram for explaining an application example to a second scenario of a PDCCH transmission method according to an embodiment of the present invention.

Referring to FIGS. 4A and 4B, the number of TRPs is assumed to be 2. FIG. 4A illustrates a case where PDCCHs are transmitted from two TRPs connected through an ideal backhaul. However, as described above, in the first scenario, a plurality of QCLs may be configured by a single TRP. The terminal may identify an optimal reception beam corresponding to a transmission beam of each TRP through a beam management procedure, and receive a signal using the optimal reception beam for each TRP.

The greatest difference between the first scenario and the second scenario is the number of transport blocks (TBs) scheduled by a plurality of PDCCHs (i.e., whether the TB(s) scheduled by the plurality of PDCCHs are equal to each other or not).

In the second scenario, different TBs or TBs belonging to different HARQ processes are scheduled by independent schedulers to different PDSCHs through the respective PDCCHs. Therefore, payloads of the DCIs transmitted through the respective PDCCHs are generally different from each other. This may be applied to PUSCH scheduling in the same manner, but hereinafter, only the PDSCH case will be described for convenience.

On the other hand, in the first scenario, the same TB (or, 2 TBs in case of a multiple codeword transmission by MIMO) may be scheduled through a plurality of PDCCHs. Meanwhile, in the first scenario, TB(s) having the same or different modulation and coding scheme (MCS), redundancy version (RV), and/or transport block size (TBS) may be scheduled for the same HARQ process through a plurality of PDCCHs. Hereinafter, the above-described case in which a plurality of PDCCHs schedule the TBs for the same HARQ process in the first scenario may also be described as the case of transmitting the same TB for convenience.

In the first scenario, a method of scheduling one PDSCH through a plurality of PDCCHs and a method of scheduling a different PDSCH through each PDCCH may be considered. The former is referred to as 'Method M100' and the corresponding scenario is referred to as a first-first scenario (i.e., scenario 1-1). The latter is referred to as 'Method M110', and the corresponding scenario is referred to as a first-second scenario (i.e., scenario 1-2).

Figure 5A:
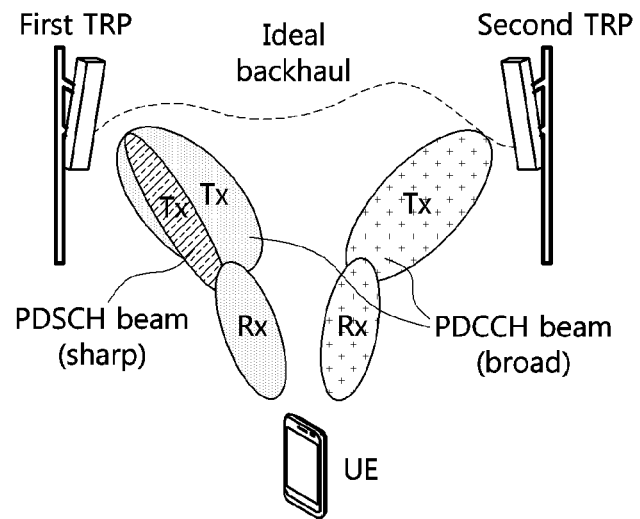
FIGS. 5A and 5B are conceptual diagrams illustrating a case of scheduling one PDSCH through a plurality of PDCCHs in a PDCCH transmission method according to an embodiment of the present invention.
Figure 5B:
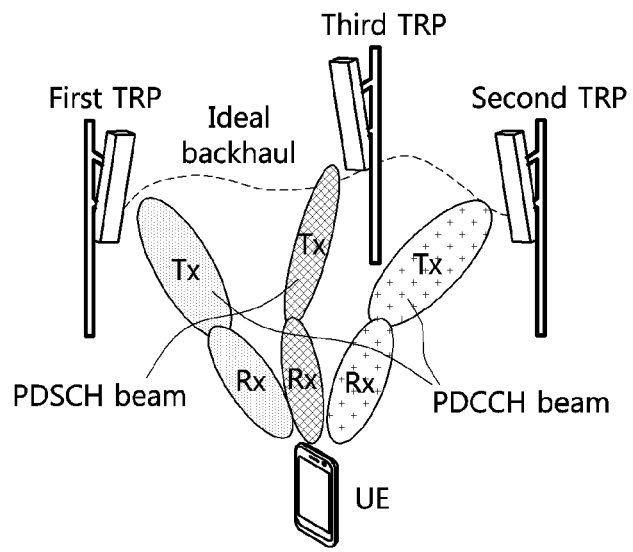

FIGS. 5A and 5B are conceptual diagrams illustrating a case of scheduling one PDSCH through a plurality of PDCCHs in a PDCCH transmission method according to an embodiment of the present invention.

Referring to FIG. 5A, a case where a first TRP transmits a PDCCH and a PDSCH, and a second TRP transmits only a PDCCH is illustrated. Here, illustrated is a case in which a beamwidth of a beam for transmission of the PDSCH (i.e., PDSCH beam) is narrower than a beamwidth of a beam for transmission of the PDCCH (i.e., PDCCH beam), i.e., a case in which the PDCCH beam and the PDSCH beam may be managed independently of each other.

Also, referring to FIG. 5B, a case where a first TRP and a second TRP transmit PDCCHs and a third TRP transmits a PDSCH are illustrated. As in the case illustrated in FIG. 5A, the PDCCH beam and the PDSCH beam may be managed independently of each other even in the case illustrated in FIG. 5B. In this case, a reception success event of the PDSCH is not dependent on a reception success event of any PDCCH. That is, even when the terminal fails to receive any one PDCCH, there is a possibility that the terminal succeeds in reception of the PDSCH. Therefore, in this case, it is possible to use Method M100, since the transmission of a plurality of DCIs (i.e., PDCCHs) for scheduling the same PDSCH is helpful to achieve a beam diversity effect. In this case, since there is one scheduled PDSCH, the payloads of the DCIs transmitted through the respective PDCCHs may be the same. Also, since there is only one scheduled PDSCH, the terminal may apply a HARQ-ACK transmission timing based on a PDSCH reception time point as in the conventional case.

Figure 6:
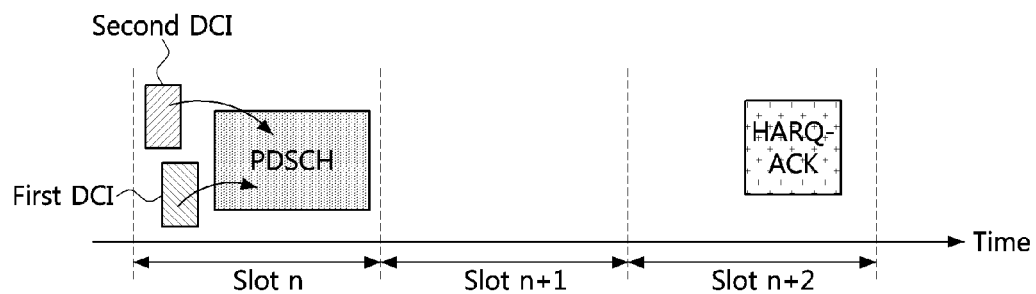
FIG. 6 is a conceptual diagram illustrating a case of scheduling one PDSCH through a plurality of PDCCHs in a PDCCH transmission method according to an embodiment of the present invention, in terms of time-frequency resources.

FIG. 6 is a conceptual diagram illustrating a case of scheduling one PDSCH through a plurality of PDCCHs in a PDCCH transmission method according to an embodiment of the present invention, in terms of time-frequency resources.

Referring to FIG. 6, as an embodiment of Method M100, a case in which a first DCI and a second DCI schedule the same PDSCH in an n-th slot and a terminal transmits an HARQ-ACK for the PDSCH in an (n+2)-th slot. As described above, PDCCHs including the first DCI and the second DCI may be transmitted through CORESETs for which different TCI states (i.e., different QCLs) are configured, respectively.

Figure 7:
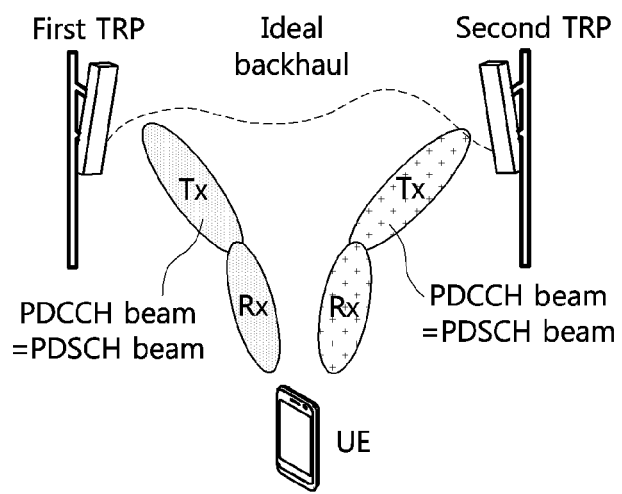
FIG. 7 is a conceptual diagram illustrating a case of scheduling a different PDSCH by using each PDCCH in a PDCCH transmission method according to an embodiment of the present invention.

FIG. 7 is a conceptual diagram illustrating a case of scheduling a different PDSCH by using each PDCCH in a PDCCH transmission method according to an embodiment of the present invention.

Referring to FIG. 7, the same TRP and the same beam may be used for transmissions of PDCCH and PDSCH. In particular, in order to maximize a beamforming gain, a UE-specific beamforming may be used for a UE-specific PDCCH, and in this case, an optimal beam of the PDCCH and an optimal beam of the PDSCH may be the same or similar. In this case, a reception success event of the PDSCH is dependent on a reception success event of the PDCCH. Therefore, if the terminal fails to receive any one PDCCH, the terminal is likely to fail to receive the PDSCH using the same or similar beam. In this case, due to the dependency, scheduling the same PDSCH through a plurality of DCIs according to Method M100 is ineffective compared to scheduling with one DCI. Therefore, in order to achieve a beam diversity effect, Method M110 may be applied instead of Method M100, so as to schedule a different PDSCH through each PDCCH. Also, payloads of the DCIs for scheduling different PDSCHs, which are transmitted through the respective PDCCHs, may be different from each other.

Also in case of Method M110, the PDSCHs corresponding to the respective PDCCHs may be transmitted in the same resource in an overlapping manner. That is, the terminal may assume that a plurality of PDSCHs scheduled through a plurality of DCIs occupy the same resource region. This scheme may be referred to as 'Method M111'. In this case, the plurality of PDSCHs occupying the same resource region may be regarded as a set of different spatial layers. Alternatively, the plurality of PDSCHs may be regarded as a set of the same layers, and in fact, one PDSCH may be received. In this case, QCLs (i.e., TCI state information) of the respective PDSCHs may be different. When the DCI includes the TCI state information of the PDSCH, DCI payloads of the respective PDCCHs may be different, and when the DCI does not include the TCI state information of the PDSCH, the plurality of PDCCHs may have the same DCI payload. When Method M111 is used and the plurality of PDCCHs have the same DCI payload, the plurality of PDCCHs may be transmitted in the same slot.

In Method M110, a plurality of PDSCHs include the same TB or TBs for the same HARQ process, so that the terminal may transmit an HARQ-ACK for the plurality of PDSCHs only once. In this case, when the plurality of PDSCHs are scheduled in different resource regions, a HARQ-ACK transmission timing may be determined based on one of the PDSCHs.

Figure 8:
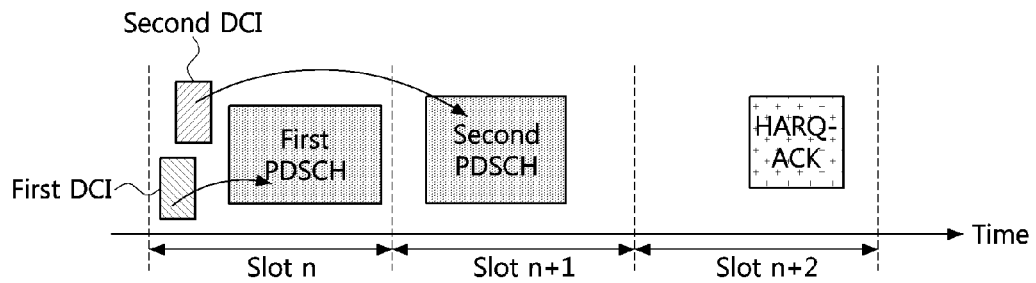
FIG. 8 is a conceptual diagram for explaining a case of scheduling different PDSCHs through the respective PDCCHs in terms of time-frequency resources in a PDCCH transmission method according to an embodiment of the present invention.

FIG. 8 is a conceptual diagram for explaining a case of scheduling different PDSCHs through the respective PDCCHs in terms of time-frequency resources in a PDCCH transmission method according to an embodiment of the present invention.

Referring to FIG. 8, a first DCI may schedule a first PDSCH in an n-th slot and a second DCI may schedule a second PDSCH in an (n+1)-th slot. The first and second PDSCHs may correspond to the same TB(s). The terminal may transmit an HARQ-ACK corresponding to the first and second PDSCHs in an (n+2)-th slot. Here, a reference time point of a transmission timing of the HARQ-ACK may be a reception time point of the first PDSCH or the second PDSCH. For example, the HARQ-ACK transmission timing may be determined based on the PDSCH (i.e., the second PDSCH) whose last symbol is received later. In other words, a slot offset K1 between the PDSCH reception and the HARQ-ACK transmission may be determined based on a slot to which the last symbol of a union of all PDSCH resource regions belongs.

In FIG. 8, a case where a value of K1 is assumed to be 1 is exemplified. The terminal may receive the value of K1 (=1) from the base station through a higher layer signaling or a physical layer signaling.

Meanwhile, a PDSCH decoding time N1 may also be determined based on a reception completion time point of the first PDSCH or the second PDSCH. For example, the terminal may determine N1 based on the PDSCH (i.e., the second PDSCH) whose last symbol is received later. Alternatively, a later time point among PDSCH processing completion times estimated by Nis of the first and second PDSCHs, and a value of N1 corresponding thereto may be used to determine a valid HARQ-ACK transmission time point. For example, even when a 15 kHz subcarrier spacing is used for the first and second PDSCHs, and the last symbol of the first PDSCH is transmitted later than the last symbol of the second symbol, if an additional DMRS is configured to only the second PDSCH, N1 of the first PDSCH may be 8, and N1 of the second PDSCH may be 13. Accordingly, a valid HARQ-ACK transmission time point according to N1 of the second PDSCH may be later than that of the first PDSCH, and the terminal may derive the valid HARQ-ACK transmission time point based on the second PDSCH. When a HARQ transmission start timing is earlier than the valid HARQ-ACK transmission time point, the terminal may not perform transmission of the corresponding HARQ-ACK.

Alternatively, the above-described method may not be used, and the terminal may apply an HARQ-ACK timing configured for each PDSCH for transmission of the HARQ-ACK. When the HARQ-ACK transmission time points derived from the HARQ-ACK timings configured for the respective PDSCHs do not coincide with each other, the terminal may regard this as an error case and may not transmit the HARQ-ACK. For example, in the example of FIG. 8, if the K1 values of the first and second PDSCHs are all set to 2 or indicated as 2, the terminal may not transmit the HARQ-ACK corresponding to the first and second PDSCHs. Alternatively, when a plurality of PDSCHs are scheduled by a plurality of DCIs in Method M110, the plurality of PDSCHs may be limited to be scheduled in the same slot. When the multi-slot scheduling is allowed in Method M110, the plurality of PDSCHs may be scheduled in the same set of slots.

When Method M110 is used, the terminal may assume that specific fields have the same values for the plurality of DCIs. For example, the modulation and coding scheme (MCS), the redundancy version (RV), the new data indicator (NDI) field, and/or the number of codewords may have the same values for the plurality of DCIs. Alternatively, the transport block size (TBS) derived from the MCS and the resource allocation information may have the same value for the plurality of DCIs. In case of Method M111, the resource allocation information in the time and frequency domain indicated through the plurality of DCIs may be the same. On the other hand, when Method M110 is used, only specific fields of the DCIs may be allowed to have different values among the plurality of DCIs. For example, only the frequency domain resource allocation field, the time domain resource allocation field, and/or the HARQ-ACK timing indication field may be allowed to have different values among the plurality of DCIs. Alternatively, the MCS and RV fields may be allowed to have different values.

In Method M110, in case of a terminal in which a plurality of carriers or a plurality of bandwidth parts are activated, a plurality of DCIs and a plurality of PDSCHs may be transmitted through different carriers or different bandwidth parts. For example, the first DCI and the first PDSCH may be transmitted in the first carrier, and the second DCI and the second PDSCH may be transmitted in the second carrier. When cross-carrier scheduling is used, a scheduling DCI and a scheduled PDSCH may be transmitted in different carriers.

When a plurality of CORESETs are configured for the multi-beam scenario, the terminal may basically perform PDCCH monitoring for each CORESET. However, depending on a scenario, it may not be necessary to monitor all the CORESETs.

For example, in case of the scenario 1-1, since the same PDSCH is scheduled by the same DCI through a plurality of PDCCHs, it is unnecessary to monitor the remaining CORESET when the terminal successfully receives the DCI from one CORESET.

Also, in case of the scenario 1-2, different PDSCHs may be scheduled through a plurality of PDCCHs. Therefore, even if the terminal successfully receives a DCI from one CORESET, the terminal may not receive the corresponding PDSCH, and in this case, reception of another PDSCH may be expected by monitoring the remaining CORESETs. Alternatively, the terminal may receive a plurality of DCIs in advance before PDSCH decoding, so that when decoding fails with only one PDSCH, a plurality of PDSCHs may be soft-combined at a channel decoding end, thereby improving reception performance. In order to increase the soft-combining performance, different RVs may be configured for a plurality of PDSCHs.

On the other hand, in case of the second scenario, since a plurality of PDCCHs are transmitted by independent scheduling, the terminal should monitor all CORESETs.

Meanwhile, when the terminal monitors a plurality of CORESETs for multiple beams, the number of PDCCH blind decodings may increase. This may lead to an increase in the capability of the terminal or an increase in power consumption, and a method for solving the increase in the complexity of the PDCCH blind decoding is needed. One method is to set the number of PDCCH candidates that should be monitored for each CORESET to a small number. For example, in case that the number of CORESETs is 1 and the number of PDCCH candidates for a specific CCE aggregation level is X, when one CORESET is additionally configured, the number of PDCCH candidates of each CORESET may be set to X/2, so that the number of total PDCCH candidates can be kept the same. However, in this scheme, since the number of PDCCH candidates for each CORESET decreases, the control channel capacity may be reduced, and thus a PDCCH blocking probability may be increased.

The present invention proposes other methods for solving the PDCCH blind decoding complexity problem. For this, a PDCCH search space configuration method, a blind decoding priority configuration method, and a DCI monitoring indication method will be sequentially described.

Method for Configuring a PDCCH Search Space

The following describes a PDCCH search space configuration method and a monitoring method of a terminal for reducing PDCCH blind decoding complexity when a plurality of CORESETs are configured.

FIGS. 9A to 9D are conceptual diagrams for explaining a PDCCH search space configuration method according to an embodiment of the present invention.

Figure 9A:
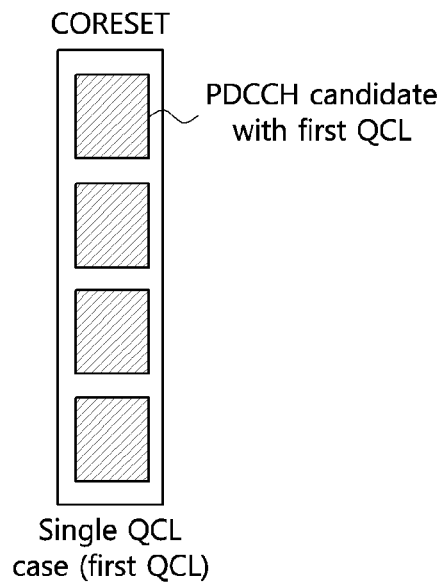
FIGS. 9A to 9D are conceptual diagrams for explaining a PDCCH search space configuration method according to an embodiment of the present invention.

Referring to FIG. 9A, it is assumed that one QCL is configured in one CORESET, and the CORESET includes 4 PDCCH candidates. The 4 PDCCH candidates may have the same CCE aggregation level or different CCE aggregation levels. For convenience, the CCE aggregation level is not considered in FIGS. 9A to 9D. Also, in the present specification, for convenience, the CORESET may mean a specific search space logically associated with the CORESET, or included in the CORESET. For example, the CORESET includes 4 PDCCH candidates as described above, which means that a specific search space corresponding to the CORESET includes 4 PDCCH candidates. The specific search space may be a search space used for receiving the multi-beam PDCCH, and may be a search space configured by the base station for the purpose.

Figure 9B:
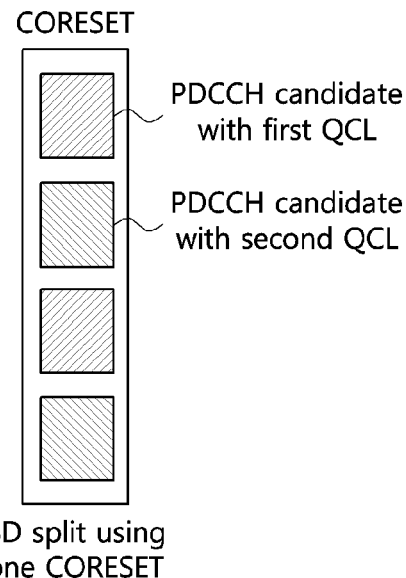
Figure 9C:
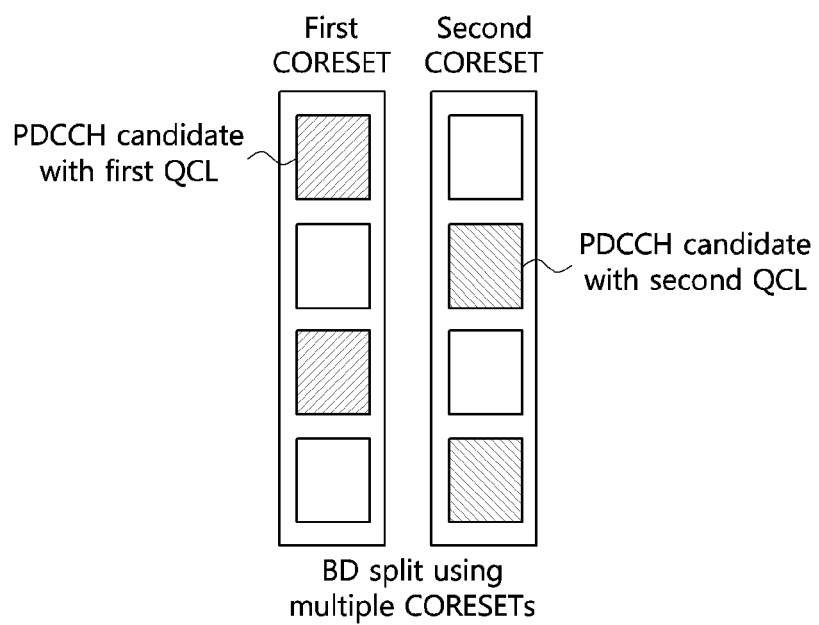
Figure 9D:
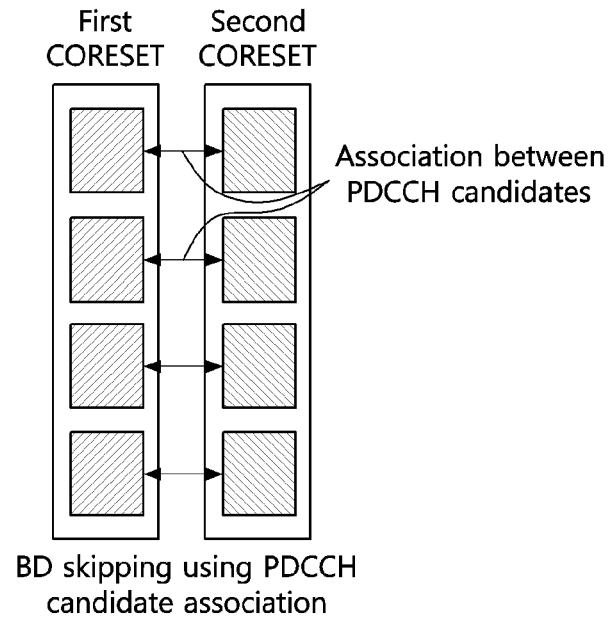

On the other hand, in the cases illustrated in FIGS. 9B and 9D, it is assumed that a total of 2 QCLs, i.e., first and second QCLs, are configured for the PDCCH of the same terminal by adding one QCL configuration.

First, FIG. 9B illustrates a case where different QCLs are configured to PDCCH candidates within one CORESET without adding a CORESET, and in this case, the 2 PDCCH candidates are set to the first QCL and the remaining 2 PDCCH candidates are set to the second QCL. Therefore, although the total number of PDCCH candidates to be monitored by the terminal remains unchanged, the PDCCH blocking probability may be increased because it is necessary to transmit twice as many PDCCHs to the terminal within the same resource region.

Also, FIG. 9C illustrates a method for further configuring a CORESET having an independent QCL configuration and decreasing the number of PDCCH candidates for each CORESET as described above. In this example, each of the first and second CORESETs is configured to have half of the case of FIG. 9A, i.e., 2 PDCCH candidates. This method may lower the PDCCH blocking probability compared to the method illustrated in FIG. 9B by increasing the control channel region. However, since the number of PDCCH candidates per CORESET is reduced, the PDCCH blocking probability may be higher than in the case of the single QCL of FIG. 9A.

Finally, FIG. 9D illustrates a method proposed by the present invention, wherein a plurality of CORESETs having independent QCL configurations are configured, and PDCCH candidates belonging to different CORESETs are mutually associated. This method is referred to as 'Method M200'.

FIG. 9D illustrates a case in which 4 PDCCH candidates of a first CORESET are respectively associated with 4 PDCCH candidates of a second CORESET on a one-to-one basis. When Method M200 is used, the base station may transmit a plurality of DCIs for the same TB through the PDCCH candidates associated with each other.

Figure 10:
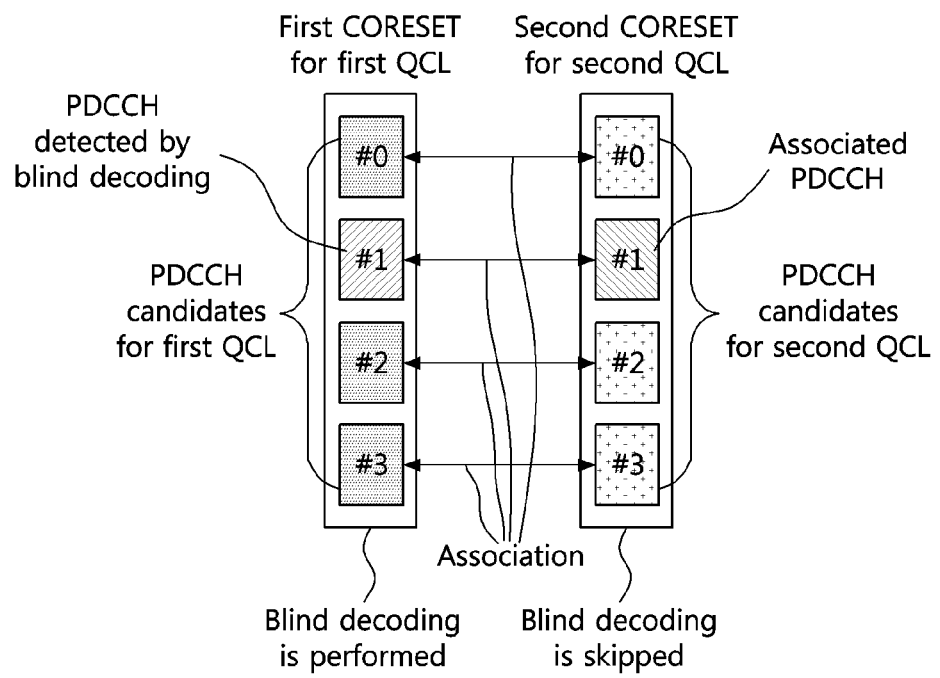
FIG. 10 is a conceptual diagram for explaining a PDCCH search space configuration method according to an embodiment of the present invention in further detail.

FIG. 10 is a conceptual diagram for explaining a PDCCH search space configuration method according to an embodiment of the present invention in further detail.

As shown in FIG. 10, the PDCCH candidates 0 to 3 of the first CORESET are associated with the PDCCH candidates 0 to 3 of the second CORESET, respectively, according to Method M200. In this case, the base station may transmit 2 DCIs for the same TB through the PDCCH candidates associated with each other. For example, in the present embodiment, DCIs of the same TB for a specific terminal are transmitted through the PDCCH candidate #1 of the first and second CORESETs. The plurality of DCIs for the same TB may have the same payload or different payloads according to the above-described scenario. That is, the former case may correspond to the scenario 1-1 or 1-2, and the latter case may correspond to the scenario 1-2 or the second scenario. Also, the plurality of DCIs for the same TB may be a plurality of downlink scheduling DCIs or a plurality of uplink scheduling DCIs. FIGS. 9D and 10 illustrate the case where there are 2 CORESETs, but Method M200 may be applied even when there are 3 or more CORESETs.

In Method M200, the mapping or association between PDCCH candidates may be defined bidirectionally. For example, when the terminal first monitors the first CORESET, the terminal may attempt to additionally receive the PDCCH candidate of the second CORESET mapped to the PDCCH candidate received successfully in the first CORESET, and conversely when the terminal first monitors the second CORESET, the terminal may further attempt to receive the PDCCH candidate of the first CORESET mapped to the PDCCH candidate received in the second CORESET. This corresponds to the case where the PDCCH candidates are mapped on a one-to-one basis. When the PDCCH candidates are mapped on one-to-many basis or many-to-many basis, the number of PDCCH candidates to be additionally monitored by the terminal may increase to some extent. On the other hand, when the CORESET monitoring order of the terminal is predetermined, it may be sufficient that the mapping or association between the PDCCH candidates is unidirectional defined in Method M200.

The method by which the base station transmits a plurality of DCIs according to the above method provides a room for the terminal to reduce the number of PDCCH blind decodings. For example, as shown in FIG. 10, if the terminal monitors the first CORESET first, the terminal may succeed in receiving the PDCCH on the PDCCH candidate #1. In this case, based on the PDCCH candidate the DCI of which has been successfully received in the first CORESET, the terminal may monitor the PDCCH candidate of the second CORESET associated with the PDCCH candidate, i.e., the PDCCH candidate #1. Accordingly, the terminal may skip the PDCCH blind decoding by performing the PDCCH blind decoding only on the first CORESET and monitoring only the predetermined PDCCH candidate on the second CORESET. In the example of FIGS. 9D and 10, the terminal performs blind decoding on 4 PDCCH candidates in the first CORESET and decodes only one PDCCH candidate in the second CORESET due to the association relationship, so that the terminal performs a total of 5 PDCCH blind decoding attempts. Thus, Method M200 requires a number of blind decodings similar to the case of FIGS. 9A to 9C when the terminal successfully receives the DCI from the first monitored CORESET.

If the terminal succeeds in receiving a plurality of DCIs in the first CORESET, the terminal may monitor the PDCCH candidate of the second CORESET, which are associated with each successfully received PDCCH candidate. For example, downlink DCIs of the same TB for a specific terminal are transmitted through the PDCCH candidate #0 of the first and second CORESETs, and uplink DCIs of another same TB are transmitted through the PDCCH candidate #1 of the first and second CORESETs. Assuming the association relationship of FIG. 10, when the terminal succeeds in receiving the DCI through PDCCH candidates #0 and #1 in the first CORESET, the terminal may expect that a downlink DCI and an uplink DCI are transmitted respectively through the PDCCH candidates #0 and #1 of the second CORESET.

Method M200 may be limitedly applied to a specific CORESET, a specific search space, a specific DCI format, and/or a specific RNTI type. For example, multi-beam based PDCCH transmission may only be used for unicast transmission. In this case, Method M200 may be applied to a CORESET, a search space, a DCI format, and/or an RNTI type for unicast transmission. For example, the RNTI type may be a cell RNTI (C-RNTI) and/or a temporary cell RNTI (TC-RNTI). In consideration of heterogeneous traffic, the C-RNTI may be a plurality or a C-RNTI whose length is extended by combining with other bit(s). In another example, the DCI format may include a DCI format 0_1 and a DCI format 1_1, and may further include a DCI format 0_0 and a DCI format 1_0. In yet another example, the search space may be a UE-specific search space. The specific CORESET, search space, DCI format, and/or RNTI type to which Method M200 is applied may be pre-defined in the specification or signaled to the terminal by the base station. The signaling or MAC CE signaling may be considered as the signaling.

Method M200 is characterized in that the total number of PDCCH blind decodings may not be substantially increased without decreasing the number of PDCCH candidates for each CORESET. Therefore, the PDCCH blocking probability for each CORESET is the same as or similar to that of the single QCL case, so that a very low PDCCH blocking probability can be maintained. That is, Method M200 provides higher performance than the methods of FIGS. 9B and 9C in terms of PDCCH blocking probability.

However, in Method M200, if the terminal does not receive the DCI from the first monitored CORESET, the blind decoding may also be performed on the subsequent CORESET. Therefore, blind decoding complexity and power consumption of the terminal may be increased. Thus, in Method M200, the reception performance of the PDCCH of the CORESET first monitored by the terminal is relatively more important.

In Method M200, a method of configuring blind decoding priorities the terminal may be considered as a method for ensuring the PDCCH reception performance of the CORESET first monitored by the terminal. This method may be referred to as 'Method M210'. In Method M210, an explicit configuration or an implicit configuration may be used. The explicit configuration is a method in which the base station explicitly configures the blind decoding priorities (or orders) of the CORESETs to the terminal, and RRC signaling, MAC signaling, and physical layer signaling may be used for the configuration. For example, when a CORESET is additionally configured in the terminal or a plurality of CORESETs are configured in the terminal at the same time, the priorities may be configured together through the RRC signaling. An example of the implicit configuration is to apply a higher priority to a CORESET with a shorter monitoring periodicity among the plurality of CORESETs. Alternatively, a higher priority may be applied to a CORESET with a longer monitoring periodicity among the plurality of CORESETs. Alternatively, priorities may be defined in order of decreasing CORESET ID or higher.

When Method M210 is used, the base station may know which CORESET is to be monitored first by the terminal, and thus may take measures to ensure the reception performance of the PDCCH of the CORESET that the terminal monitors first. For example, a higher CCE aggregation level or a higher transmission power may be used for transmission of the PDCCH of the high priority CORESET.

Meanwhile, when PDCCH candidates or CCEs greater than the maximum number of blind decodings that the terminal can perform in one slot, or greater than the maximum number of CCEs that the terminal can channel-estimate in one slot are configured, the terminal may exclude some PDCCH candidates from monitoring targets according to the priorities. In this case, the terminal may preferentially exclude PDCCH candidates of the CORESET, which is configured to have a lower blind decoding priority by the above-described Method M210, from the monitoring targets. Alternatively, in order to balance the numbers of PDCCH candidates between CORESETs and to maintain the effect of multi-beam transmission, the terminal may alternately exclude PDCCH candidates of a low priority CORESET and PDCCH candidates of a high priority CORESET from the monitoring targets. The priorities of Method M210 may be considered with other priority application rules.

Method M200 and Method M210 may work well in the first scenario where the ideal backhaul is assumed. However, in case of the second scenario in which the TRPs are connected through the non-ideal backhaul, it may be difficult to apply Method M200 and Method M210, or an achievable gain may be limited since an independent scheduler controls each CORESET. For example, even when the PDCCH candidates are associated between the CORESETs according to Method M200, since a scheduler of one TRP may not know in real time which PDCCH candidate a scheduler of another TRP uses to transmit a DCI, it may be difficult to transmit a DCI only in the PDCCH candidates associated with each other. In order to solve the above problem, PDCCH candidates or a set of PDCCH candidates through which the DCI is transmitted according to Method M200 may be limited. Information on the PDCCH candidates or the set of PDCCH candidates may be predefined or shared between TRPs or between TRP(s) and terminal(s) through signaling.

In Method M200, when PDCCH candidates belonging to different CORESETs are associated, a mapping or association rule may be complex if the configurations of the CORESETs are different. For example, if the CCE aggregation level, the number of PDCCH candidates, the type of DCI format to be monitored, etc. are configured differently for each CORESET, it may be difficult to generalize the mapping or association rule. In order to solve the above problem, some parameters of the plurality of CORESETs may be configured to be the same or similar when Method M200 is used. Specifically, a plurality of CORESETs, that is, a plurality of search spaces each corresponding to the plurality of CORESETs may be configured to have the same CCE aggregation level and the same number of PDCCH candidates. This method may be referred to as 'Method M220'. In Method M220, the DCI format to be monitored by the terminal may also be configured to be equal in the plurality of CORESETs. According to Method M220, one-to-one mapping may be applied to the association of PDCCH candidates between CORESETs since the plurality of CORESETs have the same CCE aggregation level and the same number of PDCCH candidates for each CCE aggregation level. For example, when the first and second CORESETs all include CCE aggregation levels 4 and 8 and each has 4 PDCCH candidates, the PDCCH candidates #0 to #3 for the CCE aggregation level 4 of the first CORESET may be associated with the PDCCH candidates #0 to #4 for the CCE aggregation level 4 of the second CORESET, and the PDCCH candidates #0 to #3 for the CCE aggregation level 8 of the first CORESET may be associated with the PDCCH candidates #0 to #4 for the CCE aggregation level 8 of the second CORESET. This is a result of assuming the association between the same PDCCH candidate indexes, but PDCCH candidates having different indexes may also be associated.

In Method M220, a hash function for defining a search space may generally be applied independently to each CORESET. However, in order to transmit a plurality of DCIs using the same frequency resources in a plurality of CORESETs, the same hash function may be applied to the plurality of CORESETs.

On the other hand, when a plurality of CORESETs correspond to different QCLs, a link quality may be different for each CORESET. For example, a link quality of the first CORESET may be higher than a link quality of the second CORESET. In this case, it may be desirable to configure a higher CCE aggregation level to the first CORESET as compared to that of the second CORESET. Thus, as a variation of Method M220, a method of allowing a CCE aggregation level offset between CORESETs may be used. This method may be referred to as 'Method M221'. As an embodiment of Method M221, the base station may configure to the first CORESET a CCE aggregation level two times higher than a CCE aggregation level of the second CORESET. For example, the first CORESET may include CCE aggregation levels 4 and 8, and the second CORESET may include CCE aggregation levels 2 and 4. In this case, the number of PDCCH candidates for each aggregation level may be configured to be the same to keep the mapping rule simple. Assuming that 4 PDCCH candidates and 2 PDCCH candidates are respectively configured for the CCE aggregation levels 4 and 8 in the first CORESET in the above example, 4 PDCCH candidates and 2 PDCCH candidates may be respectively configured for the CCE aggregation levels 2 and 4 in the second CORESET. In Method M221, the DCI format to be monitored by the terminal may also be configured to be the same for the plurality of CORESETs.

Method for Indicating PDCCH Monitoring

As described above, the NR system should support various scenarios for PDCCH transmission in a multi-beam and multiple TRP environment, and various scenarios may include the scenario 1-1, the scenario 1-2, and the second scenario. Also, as described above, whether the payloads of the DCIs transmitted through the plurality of PDCCHs are the same or not, the characteristics of the TBs and the PDSCHs corresponding to the respective DCIs, and the PDCCH monitoring operation of the terminal may differ from one scenario to another.

Accordingly, the base station may configure or indicate information on the PDCCH monitoring operation mode to the terminal in order to facilitate the terminal to perform PDCCH monitoring optimized for each scenario.

When a plurality of CORESETs or a plurality of search spaces (collectively referred to as a plurality of CORESETs) are configured to the terminal for multi-beam-based transmission to the terminal, the base station may inform the terminal of the number of DCIs transmitted through the plurality of CORESETs (or, the number of DCIs that the terminal can expect to receive in the plurality of CORESETs). This method may be referred to as 'Method M230'. In this case, the number of DCIs may indicate the number of scheduling DCIs for a unidirectional link. For example, if there are 2 CORESETs and the number of DCIs is set to 2, the terminal may expect 2 downlink scheduling DCIs or 2 uplink scheduling DCIs in the 2 CORESETs. Alternatively, the number of DCIs may be configured for uplink and downlink, respectively. In consideration of the above-described scenarios, the plurality of downlink scheduling DCIs or the plurality of uplink scheduling DCIs may be DCIs for the same TB or TBs belonging to the same HARQ process, or DCIs for different TBs or TBs belonging to different HARQ processes. The former may correspond to the first scenario, and the latter may correspond to the second scenario.

In the former case, i.e., in case of the first scenario, the number of DCIs according to Method M230 may mean the number of DCIs for the same TB or the same HARQ process. The terminal may monitor a plurality of DCIs for the same TB or the same HARQ process within a time window. The time window may consist of one or a plurality of consecutive slots. Alternatively, considering a case where a PDCCH monitoring occasion is configured on a symbol basis, the time window may be composed of one or a plurality of OFDM symbols. The length of the time window may be predefined in the specification or configured in the terminal by the base station.

Also, as a starting time point of the time window, a time point at which the terminal receives one DCI among the plurality of DCIs may be applied. This method may be referred to as 'Method M240'. The time point at which the DCI is received may be a slot in which the DCI is received. For example, if the time window is configured as one slot, after the terminal receives a DCI in a certain slot and identify that the number of DCIs according to Method 230 is 2, the terminal may perform PDCCH monitoring in the same slot in the expectation of receiving one more DCI for the same TB or the same HARQ process. Alternatively, the time point at which the DCI is received may be a specific symbol (e.g., the first symbol) of the PDCCH monitoring occasion including the PDCCH candidate in which the DCI is received. For example, if the time window is configured as 2 symbols, after the terminal receives a DCI in a certain PDCCH monitoring occasion of a certain CORESET and identify that the number of DCIs according to Method 230 is 2, the terminal may perform PDCCH monitoring in the first symbol and the next symbol of the PDCCH monitoring occasion in the expectation of receiving one more DCI for the same TB or the same HARQ process.

On the other hand, for another example, if the time window is configured as 2 slots and the number of DCIs is 2, the terminal may fail to receive a DCI transmitted in the first slot and succeed in receiving a DCI transmitted in the second slot. In this case, according to Method M240, the terminal may consider the second slot to be the starting time point of the time window, and may expect to receive another DCI in the second slot and the next slot. This means that the terminal applies the time window in a duration shifted backward by one slot than the base station intended. As another method for solving the above problem, the starting time point, the length, and/or the periodicity of the time window for monitoring the multiple DCIs may be preconfigured in the terminal by the base station. For example, every 2 consecutive slots may be configured as the time window. That is, both the length and periodicity of the time window may be set to 2 slots. For another example, the first and second OFDM symbols of each slot may be configured as the time window. That is, the starting time point of the time window may be set to the first symbol of the slot, the length to two symbols, and the periodicity to one slot. Some of the starting time point, length, and periodicity of the time window may be implicitly configured to the terminal. For example, the starting time point or periodicity of the time window may be determined by a starting time or periodicity of a PDCCH monitoring occasion for a certain CORESET or search space. The certain CORESET or search space may be determined according to a predetermined rule or may be configured in the terminal by the base station.

In general, when a plurality of DCIs having the same HARQ process number and the same NDI are received, the terminal may regard scheduling by a DCI received later as a retransmission of scheduling by a DCI previously received. The scheduling by the previously received DCI may correspond to an initial transmission or retransmission. In this case, after the terminal receives a DCI for a certain HARQ process, the terminal may expect not to receive a DCI having the same HARQ process number and the same NDI for a predetermined time period (e.g., one or more consecutive slots or symbols) from the time point (e.g., slot or symbol in which the DCI is received) at which the DCI for the certain HARQ process is received. Alternatively, after the terminal receives a DCI for a certain HARQ process, the terminal may expect not to receive a DCI having the same HARQ process number and a different NDI for a predetermined time period (e.g., one or more consecutive slots or symbols) from the time point (e.g., slot or symbol in which the DCI is received) at which the DCI for the certain HARQ process is received. The predetermined time period is referred to as a first time period. The first time period may be predefined in the specification or configured in the terminal by the base station.

However, when Method M230 is used in the first scenario, the terminal may receive multiple DCIs having the same HARQ process number and the same NDI within the time window described above. In this case, the terminal may regard all of the multiple DCIs as DCIs for the same order of HARQ transmissions, i.e., the n-th HARQ transmission (e.g., initial transmission when n=1, and retransmission when n>1). In general, the time window for Method M230 and the first time period may be different from each other.

In the latter case, i.e., in case of the second scenario, the number of DCIs by Method M230 may also mean the number of DCIs transmitted within the time window. For example, the time window may be one or a plurality of slots, which may be predefined in the specification or configured in the terminal by the base station.

Considering the above described scenarios, the payloads of the DCIs transmitted within the time window may be the same or different. Also, the plurality of DCIs transmitted within the time window may not correspond to the same HARQ process. Also, the plurality of DCIs may correspond to different HARQ entities.

Therefore, a method may be required to distinguish whether the plurality of DCIs received by the terminal are by Method M230 or the general case. For example, the ID of the CORESET or the ID of the search space corresponding to each TRP or HARQ entity may be configured in the terminal. In this case, the number of TRPs or HARQ entities may be equal to the number of DCIs. For example, if the time window of Method M230 is one slot and the number of DCIs is 2, the terminal may expect to receive one DCI per CORESET or search space corresponding to each TRP or HARQ entity in one slot. Alternatively, an ID of a PDCCH scrambling sequence or a scrambling ID of a PDCCH DMRS sequence corresponding to each TRP or HARQ entity may be configured in the terminal.

The number of DCIs for Method M230 may be configured semi-statically by RRC signaling, or may be configured dynamically by physical layer signaling (e.g., DCI). As an example of the physical layer signaling, downlink and uplink scheduling DCI may be used. In this case, if the terminal successfully receives one downlink scheduling DCI, the terminal may identify how many DCIs are additionally transmitted for Method M230 by reading a field of the corresponding DCI. The same may be applied also to the case of the uplink scheduling DCI. In this case, if the number of DCIs is 1, the terminal may terminate the PDCCH monitoring, and if the number of DCIs is 2 or more, the terminal may continue the PDCCH monitoring in the remaining CORESET or search space.

The number of DCIs by the physical layer signaling may mean the total number of DCIs transmitted to the terminal for Method M230. On the other hand, the DCI may be repeatedly transmitted for the purpose of coverage expansion, not multi-beam transmission. In this case, it may be unnecessary for the terminal to assume a plurality of QCLs for the DCI reception, and thus the DCI may be repeatedly transmitted in the same CORESET or the same search space. When the repeated transmissions of the DCI for multi-beam transmission and the repeated transmissions of the DCI for coverage extension are performed as associated with each other, the total number of DCIs for Method M230 may mean the number of DCIs only for the former. Alternatively, the total number of DCIs for Method M230 may include the DCIs repeatedly transmitted for coverage extension.

Alternatively, the number of DCIs by the physical layer signaling may mean the number of DCIs to be transmitted in the future or a value (i.e., a counter) corresponding thereto. In this case, since a plurality of DCIs can be transmitted at the same time, the number of DCIs may be defined as a value including all DCIs transmitted at the present time, and the present time may refer to a transmission time point (e.g., the first symbol in which the DCI is transmitted) of the DCI received by the terminal to acquire the number of DCIs.

When a plurality of DCIs are configured to be transmitted in a plurality of CORESETs or a plurality of search spaces, the base station may signal to the terminal whether the plurality of DCIs have the same payload. This method may be referred to as 'Method M231'. If the plurality of DCIs are configured to have the same payload, the terminal may attempt to receive one PDSCH assuming that the plurality of DCIs schedule the one PDSCH. On the other hand, when a plurality of DCIs are configured to have different payloads, the terminal may attempt to receive a plurality of PDSCHs assuming that the PDSCHs may be scheduled by the respective DCIs. The former may correspond to the above-mentioned scenario 1-1, and the latter may correspond to the scenario 1-2 or the second scenario. The signaling for Method M231 may be a higher layer signaling or a physical layer signaling, similarly to Method 230, and a scheduling DCI may be used for the physical layer signaling.

Method M230 and Method M231 may be used simultaneously. For example, a case where there are one DCI, a case where there are 2 DCIs having the same payload, a case where there are 2 DCIs having different payloads, and the like may be distinguished by using a 2 bit DCI field. Alternatively, the case(s) described above may be configured by RRC signaling, one of which may be indicated by a DCI. This method may be referred to as 'Method M232'.

Method M230 or Method M232 may be helpful in PDCCH beam management of the terminal. For example, the terminal may be configured to expect 2 unidirectional scheduling DCIs in two CORESETs, i.e., first and second CORESETs. In this case, if the terminal successfully receives a DCI only in the first CORESET, the terminal may determine that a DCI has not been received in the second CORESET even though the DCI has been transmitted in the second CORESET. This may be because a beam applied to the second CORESET is not suitable or its coverage is insufficient. Assuming that the base station properly performs the coverage management of the PDCCH, the reception failure may be highly likely due to a faulty beam direction or blockage. Therefore, if the terminal does not receive a DCI even though the terminal knows that the DCI has been transmitted (within a specific time period) in a certain CORESET, the terminal may determine that the TCI state of the corresponding PDCCH is no longer valid. The terminal may perform a beam management or beam recovery operation of the corresponding PDCCH, or request a related operation to the base station. For example, the above case may be treated as equivalent to a case where a radio link quality (e.g., hypothetical block error rate (BLER)) of the CORESET is lower than a reference value. For example, when the terminal has only one CORESET configured, the terminal may consider all beams of the CORESET to be invalid in this case. Therefore, the terminal may determine it as a beam failure instance and transfer it to a higher layer. Concrete details regarding beam failure and beam recovery of the PDCCH will be described later.

Separately from or together with Method M230 and Method M232, the terminal may be informed whether a plurality of PDCCHs schedule the same TB or the same HARQ process, or schedule different TBs or different HARQ processes. This method may be referred to as 'Method M233'. When the plurality of scenarios are used for the terminal as combined with each other, it is appropriate to use a dynamic signaling for Method M233, and when a specific scenario is used for the terminal, it is appropriate to use an RRC signaling for Method M233.

Meanwhile, the above-described methods may be applied not only to a plurality of CORESETs (i.e., search spaces of different CORESETs), but also to a plurality of search spaces in the same CORESET. Since the same QCL is applied to a plurality of search spaces in the same CORESET, the above-described methods may be used for the multiple TRP scenario or the PDCCH repeated transmissions using the same beam rather than the multi-beam scenario. Even in the case of the multiple TRP scenarios, it may be difficult to transmit multiple DCIs in one CORESET if the QCL is not established between the TRPs. Alternatively, the above-described methods may be applied to different monitoring periodicities of the same search space. Alternatively, the above-described methods may be applied to the same monitoring periodicity in the same search space.

Also, in the above-described methods, the DCI may include both a fallback DCI (e.g., DCI formats 0_0 and 1_0) and a non-fallback DCI (e.g., DCI formats 0_1 and 1_1). That is, if the terminal is configured to monitor both a fallback DCI and a non-fallback DCI in the CORESET or search space for the above method, it may be assumed that each DCI may be a fallback DCI or a non-fallback DCI. Alternatively, the methods described above may also be used for transmission of a group common DCI (e.g., DCI formats 2_0, 2_1, 2_2, and 2_3).

Also, as already mentioned, although PDSCH is mainly considered as a data channel to be scheduled by a plurality of DCIs in the above-mentioned methods, this is merely an example, and the above-described methods may be applied equally or similarly even when a plurality of DCIs schedule PUSCH.

Method for Beam Recovery

As described above, a TCI state for each CORESET may be configured to the terminal, and the terminal may determine a beam to be used for PDCCH reception.

In order to monitor whether the TCI state of the CORESET is valid, the base station may configure an RS for beam failure detection (hereinafter referred to as a beam failure detection RS (BFD-RS)), which is logically associated with the CORESET or has a QCL relationship with a DMRS of the CORESET, to the terminal, and the terminal may measure a radio link quality using the BFD-RS. In this case, if the radio link quality does not satisfy a certain threshold value (Qout), the terminal may determine that the beam of the corresponding CORESET, i.e., the TCI state, is no longer valid. The measurement of the radio link quality may be performed based on the hypothetical BLER of the PDCCH. Here, the fact that the radio link quality satisfies or does not satisfy the threshold value may mean that a metric used for the measurement of the radio link quality is smaller or larger than the threshold value.

Also, as the BFD-RS, a DMRS or a channel state information reference signal (CSI-RS) of an SS/PBCH block may be used. The BFD-RS may be explicitly configured in the terminal, and an RS quasi-co-located (QCLed) with the CORESET may be used as the BFD-RS if there is no configuration from the base station. For example, a first CSI-RS configuration may be explicitly signaled to the terminal as the BFD-RS for the measurement of the radio link quality of the first CORESET, and the terminal may use an RS QCLed with the second CORESET as the BFD-RS for the measurement of the radio link quality of the second CORESET.

If it is determined that the TCI states of all CORESETs are invalid, that is, if the radio link qualities of all BFD-RSs do not satisfy the beam failure threshold value Qout, the physical layer of the terminal may determine that this is a beam failure instance, and may transfer this fact to the higher layer. This method may be referred to as 'Method M300'. The beam failure instance may be periodically transferred to the higher layer, and the periodicity may be determined to be a larger value among a minimum periodicity of the BFD-RS and a value Y ms predefined in the specification. Alternatively, the beam failure instance may not be transferred to the higher layer of the terminal, and the physical layer of the terminal may directly determine whether to request a beam recovery.

If the BFD-RS is not configured by the base station, the terminal may consider RS(s) currently QCLed with the CORESET(s) to be the BFD-RS. In this case, according to Method M300, the terminal may assess link qualities of all BFD-RSs for beam failure determination. On the other hand, if the BFD-RS is not configured by the base station, the terminal may consider not only the RS(s) currently QCLed with the CORESET(s) but also all RS candidate(s) configured to the CORESET(s) by the TCI state signaling to be the BFD-RS. This may be appropriate when a plurality of TCI states are configured for a certain CORESET, and the TCI state is dynamically changed by a MAC CE. In this case, according to Method M300, the terminal may evaluate the link qualities of only the RS(s) currently QCLed with the CORESET(s) among the BFD-RS(s) for beam failure determination. For example, when 2 TCI states are configured for the first CORESET and the first TCI state among them is activated through a MAC CE signaling, the link quality of only the RS corresponding to the first TCI state for the first CORESET may be evaluated for the beam failure instance determination of Method M300.

In Method M300, the CORESET may mean a CORESET configured to the terminal in one carrier or a CORESET configured to monitor in a downlink active bandwidth part in which the terminal currently operates. In general, since an inactive bandwidth part is independent of a quality of a beam or a radio link, it may be desirable for the CORESET considered in Method M300 and below to follow the latter meaning. On the other hand, when a plurality of downlink bandwidth parts are simultaneously activated in one terminal, the latter meaning may be expanded to the CORESETs logically associated with all the active downlink bandwidth parts.

Meanwhile, the terminal may not monitor a PDCCH in a specific CORESET. For example, a certain CORESET may be configured in the terminal for purposes other than PDCCH transmission (e.g., reserved resources to which the PDSCH is rate-matched). Thus, Method M300 may be applied only to the CORESET(s) in which the terminal monitors at least one PDCCH candidate.

Alternatively, when CORESET(s) and search space(s) are configured so as to exceed the maximum number of blind decodings that the terminal can perform in one slot or the maximum CCEs for the terminal can perform channel estimation in one slot, the terminal may skip blind decodings of some PDCCH candidates for one carrier. For example, in case of a 15 kHz subcarrier spacing, the terminal may blind-decode up to 44 PDCCH candidates in one slot, and perform channel estimation on DMRS for up to 56 CCEs. In this case, when the number of PDCCH candidates configured to be monitored in a certain slot by the terminal exceeds 44 or the total number of CCEs occupied by the PDCCH candidates exceeds 56, the terminal may skip the blind decodings of the PDCCH candidates with a lower priority in the corresponding slot. In this case, the terminal may not monitor the PDCCHs in a specific CORESET for some or all of the slots.

In consideration of the above case, Method M300 may be applied only to CORESET(s) in which the terminal monitors at least one PDCCH candidate in at least one slot (or at least one search space occasion). This method may be referred to as 'Method M360'. For example, the terminal may monitor the search space of the second CORESET only in every even-numbered slot by the above-described blind decoding or CCE dropping scheme. In this case, according to Method M360, the terminal may consider only the link quality of the BFD-RS corresponding to the second CORESET for beam failure instance determination. In another example, the terminal may not monitor the search space of the third CORESET in any slot by the blind decoding or CCE dropping scheme described above. Alternatively, the fourth CORESET for PDSCH rate matching purposes may be configured in the terminal, and the terminal may not monitor the PDCCH in the fourth CORESET. In this case, according to Method M360, the terminal may exclude the link qualities of the BFD-RSs corresponding to the third CORESET or the fourth CORESET from the beam failure instance determination.

On the other hand, when a certain CORESET overlaps with a symbol indicated by a dynamic SFI as an unknown symbol or an uplink symbol, the terminal may not monitor the corresponding CORESET. Method M360 may be applied regardless of whether the CORESET monitoring by SFI is canceled or not. That is, even though search space(s) of a certain CORESET are not continuously monitored by the SFI, the link quality of the corresponding CORESET may be considered for beam failure determination. Further generalizing this, Method M360 may be applied to only the CORESET(s) in which the terminal monitors at least one PDCCH candidate in at least one slot (or at least one search space occasion) according to the semi-static configuration.

An RS for finding a new beam (hereinafter referred to as new beam identification RS (NBI-RS)) may be configured to the terminal. When a radio link quality measured using the NBI-RS satisfies a certain threshold value (Qin), the terminal may transmit an index of the NBI-RS and/or the measured radio link quality to a higher layer. As the NBI-RS, the DMRS of the SS/PBCH block or CSI-RS may be used, and a plurality of NBI-RSs may be configured to monitor a plurality of beams. When a plurality of RSs configured as the NBI-RS satisfy the threshold value Qin, the terminal may transmit the indexes of the RS s and/or the measured radio link qualities to the higher layer. Here, the measurement of the radio link quality may be performed based on RSRP, and the RSRP may be RSRP measured in the physical layer. Alternatively, the index of the NBI-RS and/or the RSRP may not be transferred to the higher layer of the terminal, and the physical layer of the terminal may directly determine whether to request a beam failure recovery.

The higher layer or the physical layer of the terminal may request the base station to recover a beam failure when two conditions are satisfied.

The first condition is a beam failure detection. If beam failure instances occur a predetermined number of times (within a reference time period), the terminal may determine that a beam failure is detected. The predetermined number of times may be one. Alternatively, the terminal may detect the beam failure with a combination of a timer and the number of beam failure instances.

The second condition is discovery of a new beam candidate. As described above, when a plurality of NBI-RSs satisfy the threshold value Qin through the measurement of NBI-RSs, the terminal may determine that a new beam candidate is found.

In case that the above two conditions are satisfied, that is, when the terminal detects the beam failure and finds a new beam candidate, the terminal may request the base station to recover the beam failure. A PRACH or PUCCH may be used for the beam failure recovery request, which may be defined as a beam failure recovery request (BFRQ)-PRACH and a BFRQ-PUCCH, respectively. If a BFRQ-PRACH is used in the beam failure recovery request, contention-based or contention-free PRACH resources may be used, and the PRACH resource (e.g., time, frequency, preamble ID, etc.) used by the terminal for the beam failure recovery request may be determined based on the NBI-RS index received from the physical layer.

On the other hand, as described above, a method of determining a beam failure instance based on BFD-RSs corresponding to all CORESETs has the following problems.

The base station may configure which DCI format the terminal is to monitor in a specific search space. For the sake of description herein, a fact that the terminal monitors a DCI format may mean that the terminal monitors a PDCCH including a CRC to which a radio network temporary identifier (RNTI) corresponding to the DCI format is scrambled. That is, a fact that the terminal monitors an RNTI 'A' may mean that the terminal monitors a PDCCH whose CRC is scrambled with the RNTI 'A'.

For example, the terminal may monitor at least C-RNTI in a search space configured to monitor the DCI formats 0_0, 0_1, 1_0, 1_1, and the like, and monitor SFI-RNTI in a search space configured to monitor the DCI format 2_0. Therefore, the terminal may be configured not to monitor C-RNTI in a specific CORESET. That is, the terminal may be configured not to monitor C-RNTI in any search space logically associated with a specific CORESET configured in the terminal. For example, the terminal may be configured such that a CORESET 0 includes only a search space 0 and only SI-RNTI is monitored in the search space 0. For another example, a common search space for monitoring only an SFI-RNTI or an RNTI (e.g., TPC-PUCCH-RNTI, TPC-PUSCH-RNTI, and TPC-SRS-RNTI) related to uplink power control for a certain CORESET may be configured in the terminal.

In this case, in the beam failure detection process for the CORESETs configured in the terminal, the terminal may determine that the TCI states of all the CORESET in which C-RNTI is monitored are no longer valid, and that the TCI states of the CORESET in which C-RNTI is not monitored is valid. In other words, all of the radio link qualities measured by the BFD-RS(s) logically associated with the CORESETs configured for monitoring C-RNTI may not satisfy the criterion (e.g., Qout), and the radio link qualities measured by the BFD-RS(s) logically associated with at least one CORESET configured for not monitoring C-RNTI may satisfy the criterion (e.g., Qout). In this case, since the terminal cannot stably receive the PDCCH, i.e., the UE-specific DCI, the CRC of which is scrambled with the C-RNTI, the terminal may not receive a control message of the higher layer as well as data. Therefore, the terminal may have to perform a beam recovery procedure. However, according to the above-described beam failure instance condition, the terminal does not determine the case as a beam failure instance, so the terminal may fail to perform the beam failure recovery procedure. As a result, in order to receive the UE-specific DCI, the terminal may have to perform a radio link failure (RLF) recovery. Usually, a link recovery due to an RLF requires a longer delay time than the beam recovery.

In order to solve the above problem, the type of the RNTI that the terminal monitors through CORESET may be considered when the terminal determines the beam failure instance. For example, the terminal may exclude the CORESET that is configured not to monitor the UE-specific RNTI (e.g., C-RNTI (and TC-RNTI)) from the beam failure instance determination condition. Hereinafter, the C-RNTI may be used to further include the TC-RNTI in connection with the beam failure determination. That is, the C-RNTI may be used in the meaning of C-RNTI and/or TC-RNTI. If the TCI states of all CORESETs including at least one search space configured to monitor C-RNTI are not valid, the physical layer of the terminal may determine this as a beam failure instance, and may transfer this to a higher layer of the terminal. This method may be referred to as 'Method M310'. In Method M310, the search space configured to monitor C-RNTI may refer to a search space configured to monitor a downlink DCI format (e.g., DCI formats 1_0 and 1_1) the CRC of which is scrambled by the C-RNTI. Alternatively, the search space configured to monitor C-RNTI may refer to a search space configured to monitor a downlink DCI format (e.g., DCI formats 1_0 and 1_1) and an uplink DCI format (e.g., DCI formats 0_0 and 0_1) the CRC of which is scrambled by the C-RNTI. As described above, a combination of the type of the RNTI and the DCI format may be considered when the terminal determines a beam failure instance. For another example, the terminal may exclude the CORESET configured not to monitor any RNTI used for unicast transmission from the beam failure instance determination condition.

For example, the terminal may be configured to monitor SFI-RNTI and INT-RNTI through a common search space of the first CORESET and to monitor C-RNTI through a common search space or a UE-specific search space of the second CORESET. In this case, a radio link quality measured through a BFD-RS corresponding to the first CORESET satisfies the criterion Qout and a radio link quality measured through a BFD-RS corresponding to the second CORESET does not satisfy the criterion Qout. In this case, when Method M300 is used, the terminal may not determine this as a beam failure instance, but when Method M310 is used, the terminal may determine this as a beam failure instance.

Even when Method M310 is used, as a method in which the physical layer of the terminal transfers a beam failure instance to the higher layer, or a method in which the higher layer of the terminal requests the base station to recover the beam failure based on the beam failure instance, the above-described methods may be used. On the other hand, the beam failure instance according to Method M310 may not be transferred to the higher layer of the terminal, and the physical layer of the terminal may directly determine whether the beam failure occurs or not and whether to request the base station to recover the beam failure, based on the information on the beam failure instance. This method may be referred to as 'Method M311'. Even when Method M311 is used, as a method for the physical layer of the terminal to determine the beam failure or to request the beam recovery, the above-described methods may be used.

As a variation of Method M310, the terminal may determine the beam failure instance only for CORESET(s) including the UE-specific search space. That is, when the TCI states of all CORESETs including at least one UE-specific search space are invalid, the terminal may determine this as a beam failure instance. This method may be referred to as 'Method M320'. The terminal may always monitor C-RNTI in the UE-specific search space.

Alternatively, the terminal may determine a beam failure instance only for CORESETs other than the CORESET 0 (i.e., CORESET ID=0). That is, when the TCI states of all the CORESETs other than the CORESET 0 are invalid, the terminal may determine this as a beam failure instance. This method may be referred to as 'Method M321'. Method M321 may be used in combination with other methods, namely Method M310, Method M311, or Method M320. That is, Method M310, Method M311, and Method M320 may be applied to CORESETs other than the CORESET 0. This is because the QCL of the CORESET 0 uses a reference RS different from those of other CORESETs as described above. More generally, a plurality of methods may be used in combination among Method M310, Method M311, Method M320, and Method M321.

As another method for solving the above-mentioned problem, the terminal may expect that each CORESET is configured to include at least one search space for monitoring C-RNTI. This method may be referred to as 'Method M330'. In Method M330, similarly to Method M310, the search space for monitoring C-RNTI may mean a search space configured to monitor a downlink DCI format (e.g., DCI formats 1_0 and 1_1) the CRC of which is scrambled by C-RNTI, or a search space configured to monitor a downlink DCI format (e.g., DCI formats 1_0 and 1_1) or an uplink DCI format (e.g., DCI formats 0_0 and 0_1) the CRC of which is scrambled by C-RNTI. For example, the terminal may expect that each CORESET is configured to include at least one common search space configured to monitor the DCI format 1-0. The terminal may monitor the DCI format 1-0 at least using C-RNTI. In this case, in order to determine whether or not the link of the currently active bandwidth part is valid, it may be sufficient for the terminal to be configured to monitor the DCI format 1-0 in each CORESET configured in the currently active downlink bandwidth part. However, since any bandwidth part configured to the terminal may be activated through a bandwidth part switching, Method M330 may be applied to all CORESETs configured in the terminal regardless of the active bandwidth part. According to Method M330, even when Method M300 is used as a beam failure instance determination condition of the terminal, the above-described problem may not occur. Method M330 may also be used in combination with Method M321. The terminal may be configured to monitor C-RNTI in all CORESET except the CORESET 0, and the terminal may determine the beam failure instance by Method M321. As a method similar to Method M330, the terminal may expect that each CORESET is configured to include at least one UE-specific search space.

The above-described methods, i.e., Method M310, Method M311, Method M320, Method M321, and Method M330 may be used in combination with Method M360. That is, among the CORESETs in which at least one PDCCH candidate is monitored in at least one slot, the terminal may include a CORESET further satisfying the conditions of the above-described method in the beam failure instance determination condition.

After requesting the base station to recover the beam failure according to the above procedure, the terminal may expect a response from the base station. The response from the base station to the beam failure recovery request may be referred to as a beam failure recovery response (BFRR) for the sake of convenience. The terminal may receive the BFRR in a specified CORESET. The CORESET in which the terminal monitors BFRR may be referred to as a 'BFRR-CORESET. The terminal may monitor the BFRR-CORESET from an (n+4)-th slot when transmitting the BFRQ-PRACH in an n-th slot. A monitoring window of the BFRR-CORESET may be configured to the terminal by the base station, and may be configured in units of slots. The BFRR-CORESET may be configured independently of the CORESET(s) already configured in the terminal. For example, when first and second CORESETs are configured in the terminal, a third CORESET may be added as the BFRR-CORESET. Alternatively, one of the CORESET(s) already configured in the terminal may be configured as the BFRR-CORESET. The BFRQ-PRACH and the BFRR-CORESET may be configured on a cell-by-cell basis. Alternatively, the BFRQ-PRACH may be configured for each uplink bandwidth part when the terminal is configured with a plurality of uplink bandwidth parts, and the BFRR-CORESET may be configured for each downlink bandwidth part when the terminal is configured with a plurality of downlink bandwidth parts.

Meanwhile, the PDCCH DMRS of the CORESET 0 has a QCL relationship with the DMRS of the SS/PBCH block. Specifically, in the CORESET 0, a common search space (e.g., Type 0 common search space) used for transmission of SIB1 may be QCLed with an SS/PBCH block logically associated thereto, and a common search space (e.g., type 0A, type 1, or type 2 common search space) used for transmission of OSI, paging, or Msg 2/4 may be QCLed with an SS/PBCH block that the terminal selects for initial access. The terminal may periodically receive the SS/PBCH block, and periodically update the beam of the CORESET 0 according to the QCL relationship. Therefore, the beam or link quality of the CORESET 0 may be maintained relatively stable.

Considering the characteristics of the above-mentioned CORESET 0, the CORESET 0 may be used as the BFRR-CORESET. That is, the terminal may monitor the response from the base station for the beam failure recovery request in the CORESET 0, i.e., at least one search space logically associated with the CORESET 0. This method may be referred to as 'Method M340'. Method M340 may be used when the active downlink bandwidth part of the terminal includes the CORESET 0, i.e., when the terminal is configured to monitor the search space of the CORESET 0 in the active downlink bandwidth part. The active downlink bandwidth part may be a downlink bandwidth part activated in the entire duration of the beam recovery procedure due to the beam failure. When a bandwidth part switching is performed during the beam recovery procedure, the active downlink bandwidth part may be a bandwidth part that is activated in a specific partial duration of the beam recovery procedure. For example, the active downlink bandwidth part may be a bandwidth part activated in the BFRR-CORESET monitoring occasion of the terminal.

The terminal may receive the BFRR through the PDCCH the CRC of which is scrambled by a C-RNTI. In this case, Method M340 may be used when the CORESET 0 includes at least one search space configured to monitor C-RNTI. Also, since the CORESET 0 may include a plurality of search spaces for monitoring C-RNTI, a search space in which the terminal is to monitor the BFRR may be configured by the base station among the search spaces logically associated with the CORESET 0. Alternatively, Method 340 may be used when the CORESET 0 includes at least one UE-specific search space. In this case, the terminal may monitor the BFRR only through the UE-specific search space of the CORESET 0. Also, a search space in which the terminal is to monitor the BFRR may be configured by the base station among the UE-specific search space(s) logically associated with the CORESET 0. A higher layer signaling may be used for the above configuration.

The terminal may monitor the CORESET 0 even when a beam failure is detected. That is, the terminal may monitor search space(s) logically associated with the CORESET 0 for the entire duration of the beam recovery procedure from the beam failure. This method may be referred to as 'Method M350'. Method M350 may be used when the active downlink bandwidth part of the terminal includes the CORESET 0 as in the case of Method M340. The terminal may normally monitor all search spaces logically associated with the CORESET 0. When Method M350 is used, the terminal may not monitor the remaining CORESETs except the CORESET 0 and/or the BFRR-CORESET for a period during which the beam recovery procedure is in progress. The period during which the beam recovery procedure proceeds may refer to a period up to a time point at which the TCI state of the CORESET is reconfigured by the beam recovery procedure.

On the other hand, a TCI state may be configured to the terminal for transmission of a specific PDCCH of the CORESET 0. For example, in order to receive a DCI for unicast transmission in the CORESET 0, the terminal may be configured with a TCI state by the base station. The DCI for unicast transmission may mean a DCI whose CRC is scrambled by a C-RNTI or a TC-RNTI, and may further include another RNTI type (e.g., RA-RNTI). In this case, for Method M350, the terminal may normally monitor only some of the search spaces logically associated with the CORESET 0. For example, the terminal may normally monitor only the search space that is not subject to the TCI state configured by the base station among the search spaces logically associated with the CORESET 0 for a period during which the beam recovery procedure is performed.

Meanwhile, when a plurality of carriers are aggregated in the terminal, cross-carrier scheduling may be used. That is, the base station may transmit a PDCCH to the terminal in a CORESET of a first carrier, thereby scheduling a data channel (e.g., PDSCH, PUSCH) in a second carrier. In this case, if a beam failure occurs in the first carrier and the base station identifies the beam failure by receiving a beam failure recovery request, the base station may transmit a PDCCH in a CORESET of the second carrier, thereby scheduling a data channel in the second carrier. That is, the cross-carrier scheduling may be switched to self-carrier scheduling. The terminal may monitor the CORESET of the second carrier after a predetermined time since the transmission of the beam failure recovery request of the first carrier to the base station. For example, the terminal may monitor the CORESET of the second carrier from the same time point as the monitoring starting time of the BFRR-CORESET. For the switching of the monitoring of the CORESET to the second carrier, the CORESET and corresponding search space to be monitored in the second carrier may be preconfigured in the terminal by the base station. Also, the above-described CORESET monitoring switching method may be used when the terminal knows the QCL or TCI state of the CORESET to be monitored in the second carrier and the QCL or TCI state is valid. The above-described method may be equally applied to cross-bandwidth part scheduling as well as the cross-carrier scheduling.

Method for Configuring Monitoring Priorities of CORESETs

When a plurality of CORESETs having different QCLs are configured in the same symbol, the terminal may receive only a part of the CORESETs. For example, if analog beamforming is applied to a receiver of the terminal, the terminal may be able to apply only one QCL at a time for reception of a CORESET. Therefore, when a plurality of CORESETs having different QCLs are configured to be monitored in the same symbol, monitoring priorities may have to be defined among the CORESETs. The priorities may be predefined in the specification. For example, the priorities may be defined in ascending order or descending order of IDs of the CORESETs. Alternatively, the priority may be defined based on the RS ID included in the TCI state of the CORESET. Alternatively, the priority may be configured in the terminal by the base station.

On the other hand, different QCLs may be applied to a plurality of search spaces even in the same CORESET. For example, the CORESET 0 may include a Type 0 common search space for SIB1 reception and a Type 1 common search space for Msg2/Msg 4 reception. In this case, a random access response (RAR) window, i.e., a period for monitoring RA-RNTI in the Type 1 common search space for the terminal to receive Msg2, may temporally overlap with the Type 0 common search space. The Type 1 common search space may be QCLed with a DMRS of an SS/PBCH block selected by the terminal for initial access, and the Type 0 common search space may be QCLed with a DMRS of an SS/PBCH block corresponding thereto. Therefore, different QCLs may be applied to the Type 1 and Type 0 common search spaces when the RAR window is located in a specific period. In this case, beam sweeping may be applied to the Type 0 common search space, so that broadcast information such as system information may be transmitted a plurality of times through a plurality of Type 0 common search spaces associated with a plurality of SS/PBCH blocks, but beam sweeping may not be applied to the Type 1 common search space. Accordingly, the terminal may preferentially monitor the Type 1 common search space in the overlapping period. In general, if the Type 0 common search space and the Type 1 common search space overlap in at least one symbol, the terminal may preferentially monitor the Type 1 common search space. Such the priority application scheme may be referred to as 'Method M400'. Although the above-described example assumes that the Type 0 and Type 1 common search spaces belong to the same CORESET, the priorities of Method M400 may also be applied even when the Type 0 and Type 1 common search spaces belong to different CORESETs. Method M400 may be applied between the Type 0 common search space and another search space (e.g., Type 0A, Type 2, or Type 3 common search space, or UE-specific search space) other than the Type 1 common search space. Alternatively, Method M400 may be applied between the Type 1 common search space and another search space (e.g., Type 0A, Type 2, or Type 3 common search space, or UE-specific search space) other than the Type 0 common search space.

As another example, as described above, the terminal may assume that a DMRS of a PDCCH for reception of a common DCI (e.g., SI-RNTI, P-RNTI, etc.) in the CORESET 0 is QCLed with a DMRS of an SS/PBCH block selected by the terminal itself. However, the base station may inform the terminal of an RS with which a DMRS of a PDCCH for reception of a specific DCI (e.g., C-RNTI, TC-RNTI, etc.) is associated (i.e., configuration of TCI state information). In this case, the terminal may have to assume a plurality of QCLs for PDCCH reception in the same CORESET.

For example, the terminal may have to assume a QCL with the DMRS of the SS/PBCH block selected by the terminal itself for receiving a PDCCH based on SI-RNTI in the Type 0 common search space of the CORESET 0, and may have to assume a QCL with the RS configured by the base station for receiving a PDCCH based on C-RNTI. For example, the former may assume a QCL with an SS/PBCH block #0, and the latter may assume a QCL with an SS/PBCH block #1. Generally, since the Type 0 common search space is configured in a different resource for each SS/PBCH block, the PDCCH based on SI-RNTI and the PDCCH based on C-RNTI may be transmitted through the common search spaces of different resource regions, and thus it may be possible for the terminal to receive all of them. However, in some cases, Type 0 common search spaces for different SS/PBCH blocks may overlap in the same symbol. For example, in case of a specific pattern (e.g., pattern 1 (TDM)) for multiplexing of SS/PBCH blocks and CORESETs, Type 0 common search spaces for different SS/PBCH blocks (e.g., SS/PBCH blocks #0 and #1) may overlap in the same symbol. In this case, for example, when the terminal is configured to assume the QCL with the SS/PBCH block #1 for reception of the PDCCH based on C-RNTI, and at the same time, the terminal desires to receive the PDCCH based on SI-RNTI in the Type 0 common search space of the SS/PBCH block #0, the QCLs that the terminal should assume for monitoring the PDCCH of the Type 0 common search space may collide in the overlapped symbol. In this case, the terminal may be defined in the specification or configured by the base station to follow either one of the QCL assumptions according to the priorities. For example, in order to preferentially receive a C-RNTI-based PDCCH, i.e., a UE-specific DCI, the terminal may follow the QCL assumption (i.e., QCL with the SS/PBCH block #1) configured by the base station in the overlapped symbol. Alternatively, the terminal may follow the QCL with the SS/PBCH block #0 in the overlapped symbol to preferentially receive a SI-RNTI based PDCCH, i.e., a common DCI.

For another example, the terminal may have to assume the QCL with the DMRS of the SS/PBCH block selected by the terminal itself for receiving the SI-RNTI based PDCCH in the Type 0 common search space of the CORESET #0, and may have to assume the QCL with the RS configured by the base station for receiving the PDCCH based on C-RNTI in another search space (e.g., UE-specific search space) of the CORESET 0. In this case, if the Type 0 common search space and the another search space overlap in at least one symbol, the terminal may be defined in the standard or may be configured by the base station to monitor one of the search spaces according to the priorities.

The above-described methods may be generally applicable to a CORESET and/or a search space other than the CORESET 0 or the Type 0 common search space.

Method for Configuring CORESET in Dual Connectivity

A terminal may be dual-connected to a primary cell group and a secondary cell group according to dual connectivity. In this case, a primary secondary cell (PSCell) provides a function similar to a primary cell to the corresponding terminal, and may be connected to other terminals as a primary cell. Therefore, SS/PBCH blocks may be transmitted in the primary secondary cell, and in particular, the terminal may increase resource efficiency by sharing the same SS/PBCH block and CORESET with other terminals using the cell as a primary cell.

Accordingly, a terminal connected to both the primary cell group and the secondary cell group may be configured with a CORESET logically associated with the SS/PBCH block(s) of the corresponding cell in the primary secondary cell. When the primary secondary cell transmits a plurality of SS/PBCH blocks in the frequency domain, the terminal may be configured with a CORESET logically associated with one of the SS/PBCH blocks. The CORESET may have a fixed ID. Hereinafter, it is assumed that the CORESET is defined as CORESET 0 as in the case of the primary cell.

In this case, the CORESET 0 of the primary secondary cell and its corresponding search space (e.g., search space 0) may be configured in the terminal through RRC signaling. For example, the CORESET 0 of the primary secondary cell may be signaled to the terminal in a form identical or similar to configuration information (e.g., pdcch_ConfigSIB 1, SS/PBCH block index, etc.) of the CORESET 0 (and, search space 0) included in a master information block (MIB). In this case, the base station may inform the terminal together or in advance information related to transmission and measurement of the SS/PBCH block logically associated with the CORESET 0. The information related to the transmission and measurement of the SS/PBCH block may include information corresponding to information that the terminal acquires in the initial access for the SS/PBCH block in the primary cell or that is configured by the base station. For example, the information may include a transmission periodicity of SS/PBCH block, a frequency domain position of SS/PBCH block (e.g., an offset to a reference frequency or an absolute radio frequency channel number (ARFCN)), index or time domain position of actually-transmitted SS/PBCH block, radio resource management (RRM) measurement configuration of SS/PBCH block (e.g., SS/PBCH block measurement timing configuration (SMTC)), half radio frame information, and the like. The terminal may know, based on the half radio frame information, whether the SS/PBCH block is transmitted in an interval of 5 ms in the front of the radio frame or in an interval of 5 ms in the rear of the radio frame. The information may be configured through RRC signaling, and some information may be configured through cell specific RRC signaling.

The terminal may assume that the DMRS of the CORESET 0 and the DMRS of the SS/PBCH block logically associated with the CORESET 0 in the primary secondary cell have a QCL relationship. For example, a Type 0 common search space of the CORESET 0 may be configured for each SS/PBCH block, and a DMRS of each Type 0 common search space for each SS/PBCH block may have a QCL relationship with a DMRS of the corresponding SS/PBCH block. This may be limited to monitoring of SI-RNTI based PDCCH, and other QCL assumptions may be allowed for monitoring of C-RNTI based PDCCH. Alternatively, the terminal may assume QCL relationships with the DMRS of the corresponding SS/PBCH block for all PDCCHs monitored through the Type 0 common search space. In this case, the TCI state of CORESET 0 may not be separately configured in the terminal. That is, the use of RRC parameter (e.g., 'TCI-StatesPDCCH') indicating TCI state information of PDCCH may be unnecessary for configuring the CORESET 0 of the primary secondary cell. Alternatively, the terminal may receive the TCI state information of the CORESET 0 from the base station for unicast transmission through the CORESET 0 of the terminal in the RRC connected state. On the other hand, unlike the primary cell, the terminal may be configured with a TCI state for a data channel (i.e., PDSCH or PUSCH) scheduled through the search space of the CORESET 0 of the primary secondary cell. The TCI state of the data channel may be configured through RRC signaling, MAC CE, and/or physical layer signaling. For example, when physical channel signaling is included in the configuration of the TCI state of the data channel, the configuration of the CORESET 0 of the primary secondary cell may include an RRC parameter (e.g., 'TCI-PresentInDCI') indicating whether a TCI state field is present in a DCI.

The terminal may periodically receive and measure the SS/PBCH blocks configured in the primary secondary cell, and may manage a beam (or QCL, TCI state) of the CORESET 0. The measurement may be signal strength measurement for RRM, radio link monitoring (RLM), beam management, etc., and RSRP, reference signal received quality (RSRQ), or signal to interference plus noise ratio (SINR) may be used as measurement values. Thus, similarly to the primary cell, the CORESET 0 of the primary secondary cell may be used as the BFRR-CORESET described above. Therefore, the terminal may reliably receive control information through the CORESET 0 in the primary secondary cell.

The above-described method may be generally applicable to any secondary cell as well as the primary secondary cell.

On the other hand, a CORESET configured in the secondary cell may be QCLed with an SS/PBCH block transmitted in another cell, that is, the primary cell or another secondary cell. This method may be referred to as 'Method M410'. The former cell is referred to as a first cell and the latter cell is referred to as a second cell. The terminal may be configured not to have SS/PBCH block in the first cell, or may be informed that SS/PBCH blocks are not present in the first cell. The above configuration may be by implicit signaling. In this case, the terminal may apply Method M410 to the first cell, and stably receive control information through a CORESET QCLed with an SS/PBCH block of the second cell. The QCL relationship may be configured in the terminal by the base station, and higher layer signaling may be used for the configuration of the QCL. The QCL configuration information may include a physical cell ID of the second cell.

The application of Method M410 to the first cell may further mean that the first cell shares time and frequency synchronization of the second cell. That is, the terminal may apply the time and frequency synchronization acquired through the SS/PBCH block of the second cell to the first cell, and receive downlink signals of the first cell. In addition, the application of Method M410 to the first cell may further mean that the SS/PBCH block of the second cell is used for or an RRM measurement result of the second cell is reflected to RRM measurement of the first cell. In addition, the application of Method M410 to the first cell may further mean that the SS/PBCH block of the second cell is used for or a beam quality measurement result of the second cell is reflected to beam quality measurement of the first cell.

In the NR, a plurality of cells configured or activated in the terminal may be QCLed with each other. In Method M410, the second cell may be defined as a cell in which a QCL is established with the first cell. Alternatively, the second cell may be limited to a cell belonging to the same cell group as the first cell. Here, the second cell may be defined as a primary cell or a primary secondary cell belonging to the same cell group as the first cell.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. A method of a terminal, comprising:
receiving a first physical downlink control channel (PDCCH) based on a first transmission configuration indication (TCI) from a base station, and identifying a first resource region for a first physical downlink shared channel (PDSCH) based on the first PDCCH;
receiving a second PDCCH based on a second TCI from the base station, and identifying a second resource region for a second PDSCH; and
receiving, from the base station, the first PDSCH and the second PDSCH, respectively, from the first resource region and the second resource region, the first resource region being overlapped with the second resource region,
wherein the first TCI and the second TCI are configured independently from each other, and a first timing at which a hybrid automatic repeat request (HARQ)-acknowledgement (ACK) for the first PDSCH is transmitted and a second timing at which a HARQ-ACK for the second PDSCH is transmitted are separately configured to the terminal.

2. The method according to claim 1, wherein a payload of a downlink control information (DCI) carried on the first PDCCH is different from a payload of a DCI carried on the second PDCCH.

3. The method according to claim 1, wherein the terminal monitors the first PDCCH and the second PDCCH on two different control resource sets (CORESETs), the two different CORESETs being associated with the first TCI and the second TCI, respectively.

4. The method according to claim 3, wherein the first TCI and the second TCI are different, and the two CORESETs are configured on different symbols.

5. The method according to claim 1, wherein the first PDSCH and the second PDSCH comprise different sets of spatial layers.

6. The method according to claim 1, wherein the terminal assumes different quasi-co-locations (QCLs) for a reception of the first PDSCH and a reception of the second PDSCH.

7. The method according to claim 1, wherein TCIs used for the reception of the first PDSCH and the second PDSCH are configured to the terminal independently from the first TCI and the second TCI.

8. The method according to claim 1, wherein the first timing is determined based on a first slot offset from a reception timing of the first PDSCH, the second timing is determined based on a second slot offset from a reception timing of the second PDSCH, the first slot offset is indicated by the first PDCCH, and the second slot offset is indicated by the second PDCCH.

9. The method according to claim 1, further comprising:
in response to the first timing coinciding with the second timing, transmitting HARQ-ACKs for the first PDSCH and the second PDSCH at the first timing.

10. The method according to claim 1, wherein the first TCI and the second TCI correspond to different transmission and reception points (TRPs).

11. A method of a base station, comprising:
transmitting, to a terminal, a first physical downlink control channel (PDCCH) based on a first transmission configuration indication (TCI), the first PDCCH indicating a first resource region for a first physical downlink shared channel (PDSCH);
transmitting, to the terminal, a second PDCCH based on a second TCI, the second PDCCH indicating a second resource region for a second PDSCH; and
transmitting, to the terminal, the first PDSCH and the second PDSCH, respectively, in the first resource region and the second resource region, the first resource region being overlapped with the second resource region,
wherein the first TCI and the second TCI are configured independently from each other, and a first timing at which a hybrid automatic repeat request (HARQ)-acknowledgement (ACK) for the first PDSCH is received and a second timing at which a HARQ-ACK for the second PDSCH is received are separately configured to the terminal.

12. The method according to claim 11, wherein a payload of a downlink control information (DCI) carried on the first PDCCH is different from a payload of a DCI carried on the second PDCCH.

13. The method according to claim 11, wherein the terminal monitors the first PDCCH and the second PDCCH on two different control resource sets (CORESETs), the two different CORESETs being associated with the first TCI and the second TCI, respectively.

14. The method according to claim 13, wherein the first TCI and the second TCI are different, and the two CORESETs are configured on different symbols.

15. The method according to claim 11, wherein the first PDSCH and the second PDSCH comprise different sets of spatial layers.

16. The method according to claim 11, wherein the terminal assumes different quasi-co-locations (QCLs) for a transmission of the first PDSCH and a transmission of the second PDSCH.

17. The method according to claim 11, wherein TCIs used for the transmission of the first PDSCH and the second PDSCH are configured to the terminal independently from the first TCI and the second TCI.

18. The method according to claim 11, wherein the first timing is determined based on a first slot offset from a reception timing of the first PDSCH, the second timing is determined based on a second slot offset from a reception timing of the second PDSCH, the first slot offset is indicated by the first PDCCH, and the second slot offset is indicated by the second PDCCH.

19. The method according to claim 11, further comprising: in response to the first timing coinciding with the second timing, receiving HARQ-ACKs for the first PDSCH and the second PDSCH at the first timing.

20. The method according to claim 11, wherein the first TCI and the second TCI correspond to different transmission and reception points (TRPs).

\* \* \* \* \*